United States Patent
Dehni

(10) Patent No.: US 10,414,921 B1
(45) Date of Patent: *Sep. 17, 2019

(54) POLYURETHANE FOAM BASED BALLISTIC ARMOR

(71) Applicant: Virfex, LLC, Marion, MA (US)

(72) Inventor: Ghassan Dehni, Marion, MA (US)

(73) Assignee: Virfex, LLC, West Wareham, MA (US)

( * ) Notice: Subject to any disclaimer, the term of this patent is extended or adjusted under 35 U.S.C. 154(b) by 66 days.

This patent is subject to a terminal disclaimer.

(21) Appl. No.: 15/457,737

(22) Filed: Mar. 13, 2017

Related U.S. Application Data

(63) Continuation-in-part of application No. 14/477,521, filed on Sep. 4, 2014, now Pat. No. 10,138,373.

(60) Provisional application No. 62/307,295, filed on Mar. 11, 2016, provisional application No. 61/873,661, filed on Sep. 4, 2013.

(51) Int. Cl.

| | | |
|---|---|---|
| *A41D 13/05* | (2006.01) | |
| *A41D 13/06* | (2006.01) | |
| *A42B 3/12* | (2006.01) | |
| *C08G 18/48* | (2006.01) | |
| *C08G 18/61* | (2006.01) | |
| *C08G 18/76* | (2006.01) | |
| *C08L 75/04* | (2006.01) | |
| *C08L 75/08* | (2006.01) | |
| *C08L 83/04* | (2006.01) | |
| *F41H 5/04* | (2006.01) | |
| *C08G 101/00* | (2006.01) | |

(52) U.S. Cl.
CPC .......... *C08L 75/08* (2013.01); *A41D 13/0512* (2013.01); *A41D 13/06* (2013.01); *C08G 18/48* (2013.01); *C08G 18/61* (2013.01); *C08G 18/7664* (2013.01); *C08L 75/04* (2013.01); *C08L 83/04* (2013.01); *A42B 3/125* (2013.01); *C08G 2101/0008* (2013.01); *C08G 2101/0058* (2013.01); *C08G 2101/0066* (2013.01); *C08G 2350/00* (2013.01); *C08G 2410/00* (2013.01); *F41H 5/0421* (2013.01); *F41H 5/0428* (2013.01)

(58) Field of Classification Search
CPC ..... F41H 5/0421; F41H 5/0428; A41D 13/06; A41D 13/0512; A42B 3/125; C08G 2101/008; C08G 2101/0058; C08G 2101/0066; C08G 2350/00; C08G 2410/00; C08L 75/04
See application file for complete search history.

(56) References Cited

U.S. PATENT DOCUMENTS

| | | |
|---|---|---|
| 3,567,568 A | 3/1971 | Windecker |
| 3,959,191 A | 5/1976 | Kehr et al. |
| 4,043,329 A | 8/1977 | DiMatteo |
| 4,758,601 A * | 7/1988 | Haas .................. C08G 18/0819 521/108 |
| 5,167,876 A | 12/1992 | Lem et al. |
| 5,254,597 A | 10/1993 | Horn et al. |
| 5,480,706 A | 1/1996 | Li et al. |
| 5,527,833 A | 6/1996 | Kuczynski et al. |
| 5,786,402 A | 7/1998 | Bruchmann et al. |
| 6,046,247 A | 4/2000 | Gluck et al. |
| 6,201,035 B1 | 3/2001 | Tuinman et al. |
| 6,288,133 B1 | 9/2001 | Hagquist |
| 6,326,077 B1 | 12/2001 | Monaci |
| 6,509,388 B1 | 1/2003 | Addison |
| 6,681,400 B1 * | 1/2004 | Mills ......................... F41H 1/02 2/2.5 |
| 7,930,966 B1 | 4/2011 | Bhatnagar et al. |
| 8,176,830 B1 * | 5/2012 | Tan ....................... F41H 5/0428 89/36.02 |
| 2004/0116546 A1 | 6/2004 | Jakobstroer et al. |
| 2004/0153040 A1 | 8/2004 | Martineau et al. |
| 2006/0234899 A1 | 10/2006 | Nekmard et al. |
| 2007/0072951 A1 | 3/2007 | Bender et al. |
| 2007/0128367 A1 | 6/2007 | Tabakovic et al. |
| 2007/0197672 A1 | 8/2007 | Lekovic et al. |
| 2008/0075933 A1 | 3/2008 | Rovers |
| 2010/0000564 A1 | 1/2010 | Monda et al. |
| 2010/0286584 A1 | 11/2010 | Areskoug et al. |
| 2011/0041675 A1 * | 2/2011 | Ermalovich .......... F41H 5/0421 89/36.02 |
| 2011/0203024 A1 * | 8/2011 | Morgan .................... F41H 1/04 2/2.5 |
| 2012/0245243 A1 | 9/2012 | Lindner et al. |
| 2014/0260933 A1 | 9/2014 | Ardiff et al. |

(Continued)

FOREIGN PATENT DOCUMENTS

| | | |
|---|---|---|
| CN | 101735763 A | 6/2010 |
| CN | 101792152 A | 8/2010 |

(Continued)

OTHER PUBLICATIONS

Forrest; "Coatings and Inks for Food Contact Materials"; Rapra Review Reports 186; (2005); 142 pages; vol. 16, No. 6.; <ISSN: 0889-3144 >.

(Continued)

*Primary Examiner* — Melissa A Rioja

(74) *Attorney, Agent, or Firm* — Thorpe North & Western, LLP

(57) ABSTRACT

A multi-layered ballistic material can include a polyurethane foam layer and a ballistic impact absorption layer. The polyurethane foam can be formed from an isocyanate and a polyol; a polymerization reactor initiator that is an isoprenoid compound; and a polymerization reaction accelerator.

22 Claims, 10 Drawing Sheets

(56) References Cited

U.S. PATENT DOCUMENTS

| | | | |
|---|---|---|---|
| 2014/0290474 A1* | 10/2014 | Citterio | F41H 5/0428 89/36.02 |
| 2015/0239208 A1 | 8/2015 | Basela | |
| 2016/0113348 A1 | 4/2016 | Twardowski, Jr. | |
| 2016/0159034 A1 | 6/2016 | Bhatnagar et al. | |
| 2016/0250118 A1 | 9/2016 | Consoli et al. | |

FOREIGN PATENT DOCUMENTS

| | | |
|---|---|---|
| DE | 2406088 A1 | 8/1975 |
| GB | 1498030 A | 1/1978 |
| IL | 128176/2 A1 | 10/2006 |
| JP | S50-87196 A | 7/1975 |
| JP | S5111896 A | 1/1976 |
| JP | H01-123839 A | 5/1989 |
| JP | H05-5247339 A | 9/1993 |
| JP | H08-41157 A | 2/1996 |
| JP | 2001-088158 A | 4/2001 |
| SU | 1752742 A1 | 8/1992 |
| WO | WO 2013/092564 A1 | 6/2013 |

OTHER PUBLICATIONS

Uddin et al, "Improving Ballistic Performance of Polyurethane Foam by Nanoparticle Reinforcement." Journal of Nanotechnology; Hindawi Publishing Corporation; 2009; vol. 2009; pp. 1-8.

* cited by examiner

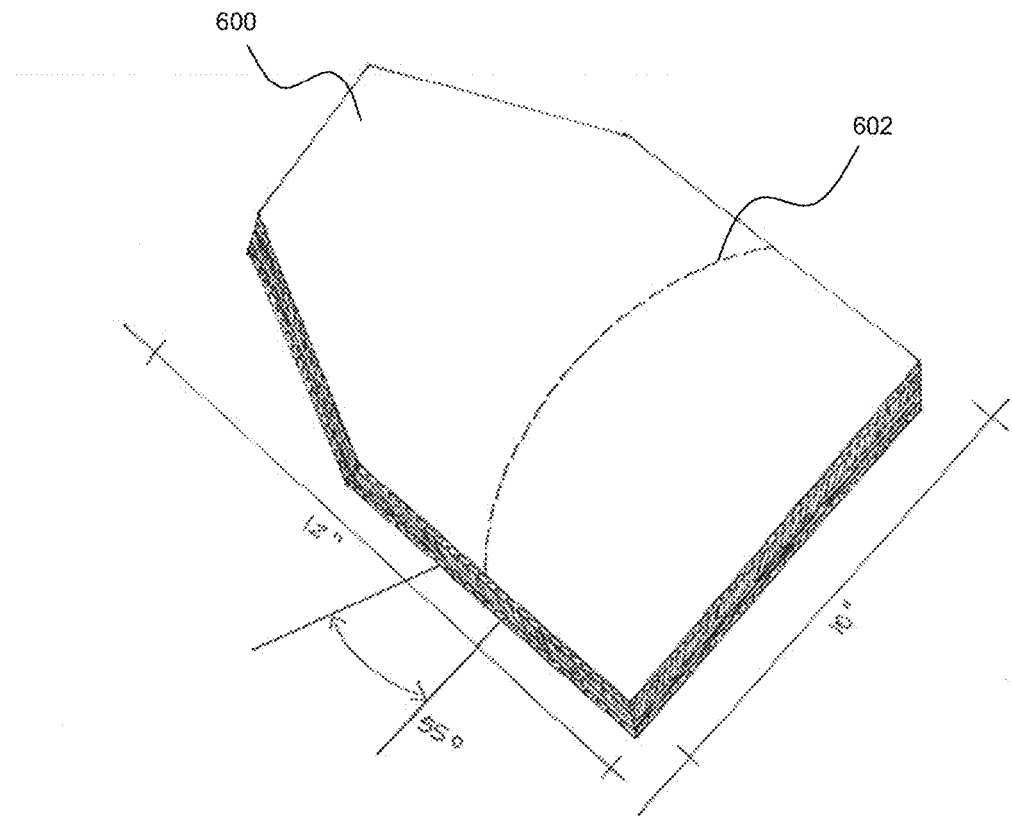
FIG. 6A
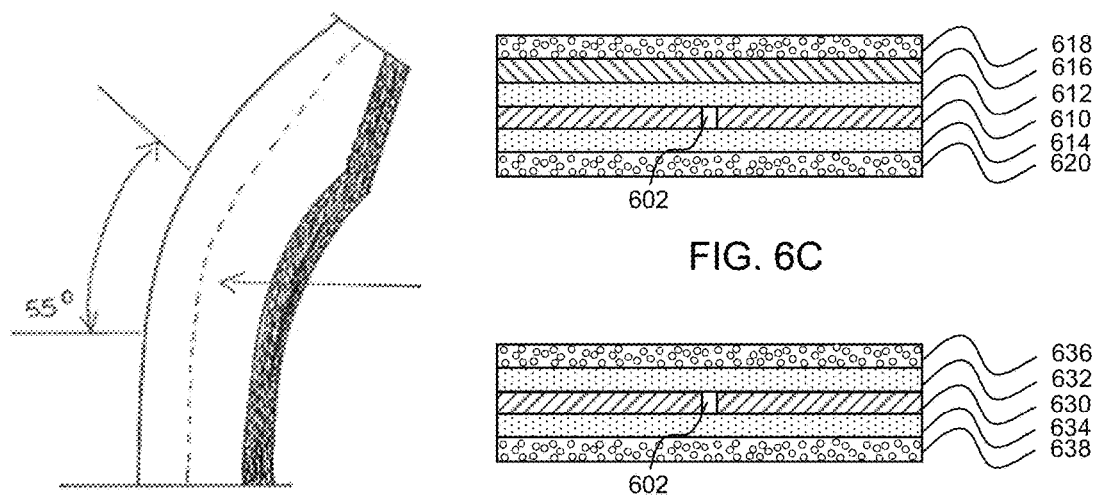
FIG. 6B
FIG. 6C
FIG. 6D

POLYURETHANE FOAM BASED BALLISTIC ARMOR

RELATED APPLICATIONS

This application claims the benefit of U.S. Provisional Application No. 62/307,295 filed on Mar. 11, 2016 and this application is a continuation-in-part of U.S. Non-Provisional application Ser. No. 14/477,521 filed on Sep. 4, 2014 which claims priority to U.S. Provisional Application No. 61/873,661 filed on Sep. 4, 2013, which are incorporated herein by reference.

FIELD OF THE INVENTION

This invention relates to flexible polyurethane foam materials in combination with a ballistic impact absorption layer in multi-layered ballistic armor for use within various environments such as, but not limited to, flexible bullet proof vests, bullet proof helmets, bullet proof shields; flexible and rigid bullet proof body armor, armored vehicles, watercraft, aircraft, bullet proof wall panels, and bullet proof mats.

BACKGROUND

Ballistic armor can dramatically reduce risk of injury and death to persons and property as a result of firearm projectiles, explosive shrapnel, or other ballistic materials. Ballistic armor has gained acceptance with law enforcement officers, military servicemen, security professionals, and civilians for its reliability, cost, and performance. Ballistic armor has improved dramatically over the past century. A wide variety of materials have been used alone and as composite layered materials to produce ballistic armor.

Para-amid synthetic woven fiber materials such as KEVLAR® (du Pont de Nemours and Company) are currently among the most popular core materials for ballistic armor. Although significant advances have been made, many ballistic armor materials still allow a user to receive blunt trauma, bruising, and in some cases, injuries from secondary impacts (i.e. impacts from projectiles deflected from the ballistic armor).

It is well documented that flexible polyurethane foam is produced from: a polyol, an isocyanate, water, a catalyst, and a surfactant, Polyol and isocyanate are mixed to form polyurethane linkage. Water is present as a blowing agent in an aqueous hydrophilic environment. Additives, catalyst and surfactant serve to promote nucleation, stabilization of the foam formation during the development stage, and improve foam properties for commercial application.

Polyurethane properties in flexible foam are influenced by the types of isocyanate and polyols used. The most commonly used isocyanates are aromatic diisocyanate or methylene diphenyl diisocyanate (MDI). Polyols can be polyether polyols or polyester polyols. Polyether polyols are made by the reaction of epoxides with an active hydrogen containing starter compounds. Examples of polyether polyols, among others, are: propylene glycol, 1,3-butanediol, 1,4-butanediol, ethylene glycol, neopentyl glycol, 1,6-hexane diol, diethylene glycol, glycerol, diglycerol, pentaerythritol and trimethylol propane and similar low molecular weight polyols. Polyester polyols are formed by polycondensation of multifunctional carboxylic and hydroxyl compounds.

In addition to the polyether and polyester polyols, polymer polyols can be used in flexible polyurethane foam to increase foam resistance to deformation. There are two types of polymer polyols: a graft polyol and a polyurea modified polyol. In addition, some polyols that exist commercially are natural oil polyols. These oleochemical polyols have good hydrophobicity and exhibit excellent hydrolysis resistance, chemical resistance and UV resistance. With the presence of a crosslinker, these natural oil-based polyols (i.e. Sovermol® (BASF)) form a polyurethane by linking with an isocyanate. Natural oil polyols are polyfunctional alcohols based on renewable raw materials like castor oil, soybean oil, and palm kernel oil, dipropylene glycol or glycerine which are often added as initiators to produce polyols for more flexible applications. Propylene oxide and/or ethylene oxide are then added to the initiators until a desired molecular weight is achieved. The order and amounts of each oxide affect many polyol properties such as water solubility and reactivity.

In general, polyurethane foam is made using organic polyisocyanates such as phenylene diisocyanate, toluene diisocyanate, hexamethylene diisocyanate, or 4,4-diphenylmethane diisocyanate (MDI).

Flexible polyurethane foam is a common material used to protect objects from impact forces such as in athletic activities, automotive applications, and boating applications. Such foams are lightweight and contain small pores that allow foam to deform elastically under impact so that energy is absorbed and dissipated as the material is compressed. However, flexible foams can only be customized to respond to a very specific range of impact energies and hence generally cannot perform well across a wide range of impact types. A foam that is too soft for an impact will compress too quickly and transmit excessive force to an impacted body. Localized compression of a flexible foam decreases the area over which force is transmitted and therefore increasing pressure and damage of the impact. A foam that is too hard for a specific type of impact will not compress sufficiently and will decelerate the impacted body too quickly. This results in excessive resistance in the early phase of impact and will not compress enough to prolong distance or time of impact. Therefore, advances in impact foams continue to be sought that exhibit light weight, resilience, and desirable impact response to variety of impact types.

Silicone resins are common and used in various applications due to their superior properties in heat and chemical resistance, electrical insulation properties, water repellency and safety to humans.

SUMMARY

In one embodiment presented herein, is a multi-layered ballistic armor including a layer of a polyurethane foam material and a ballistic impact absorption layer. The polyurethane foam material can include polyurethane, a polymerization reaction initiator, and a polymerization reaction accelerator. The polyurethane can be formed from an isocyanate and a polyol while the polymerization reaction initiator can be an isoprenoid compound.

In one example, the ballistic impact absorption layer can be a para-amid synthetic fiber, a ballistic ceramic, ultrahigh molecular weight polyethylene fiber woven fabric, a synthetic woven fiber, or combination thereof. In one example, the ballistic impact absorption layer can be a composite multi-layer assembly.

In another example, the polyurethane foam material can optionally further include a polyorganosiloxane polymer, a gelling agent, an emulsification control agent, a reinforcement filler, and/or a reinforcement polymer. Additional optional components can be added to further enhance the foam materials and are more fully outlined in the following detailed description. In one example, the multilayered ballistic armor can be arranged in the shape of panels.

Further provided herein is a method coating a material with a flexible polyurethane foam to form multi-layered flexible and rigid ballistic armor. In one example, the method can include applying a polyurethane foam as an exterior coating to a material to form a coated material. The polyurethane form can be formed from a polyurethane, a polymerization reaction initiator, and a polymerization reaction accelerator. The polyurethane can be formed of an isocyanate and a polyol while the polymerization reaction initiator can be an isoprenoid compound. The material can also include a ballistic impact absorption material.

There has thus been outlined, rather broadly, the more important features of the invention so that the detailed description thereof that follows may be understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIGS. 6A is a schematic of a multi-layered composite body panel in accordance with an embodiment of the present technology;

FIGS. 6B is a side perspective view showing the panel of 6A in flexure forward or back at a desired flexure angle in accordance with an embodiment of the present technology;

FIG. 6C is a side cross-sectional view of a multi-layered composite panel in accordance with an embodiment of the present technology;

FIG. 6D is a side cross-sectional view of a multi-layered composite panel in accordance with another embodiment of the present technology;

Figure 1:
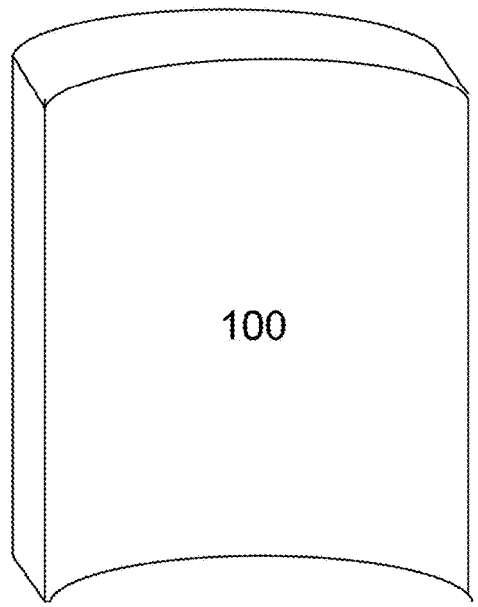
FIG. 1 is a schematic illustration of a multi-layered ballistic armor in accordance with an embodiment of the present technology.

These drawings are provided to illustrate various aspects of the invention and are not intended to be limiting of the scope in terms of dimensions, materials, configurations, arrangements or proportions unless otherwise limited by the claims. Reference will now be made to the exemplary embodiments illustrated, and specific language will be used herein to describe the same. It will nevertheless be understood that no limitation of the scope of the invention is thereby intended.

DETAILED DESCRIPTION

While these exemplary embodiments are described in sufficient detail to enable those skilled in art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following embodiments are set forth without any loss of generality to, and without imposing limitations upon, any claims set forth. It is also to be understood that the terminology used herein is for the purpose of describing particular embodiments only, and is not intended to be limiting. Unless defined otherwise all technical and scientific terms used herein have the same meanings as commonly understood by one of ordinary skill in the art to which this disclosure belongs.

In describing and claiming the present invention, the following terminology will be used.

The singular forms "a," "an," and "the" include plural referents unless the context clearly dictates otherwise. Thus, for example, reference to "an initiator" includes reference to one or more of such materials and reference to "reacting" refers to one or more such steps.

As used herein with respect to an identified property or circumstance "substantially" refers to a degree of deviation that is sufficiently small so as to not measurably detract from the identified property or circumstance. The exact degree of deviation allowable may in some cases depend on the specific context.

As used herein, the terms "about" and "approximately" are used to provide flexibility, such as to indicate, for example, that a given value in a numerical range endpoint may be "a little above" or "a little below" the endpoint. The degree of flexibility for a particular variable can be readily determined by one skilled in the art based on the context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context. In certain cases, two elements that are "adjacent" can be neighboring elements without any other elements between the adjacent elements.

As used herein, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that, which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, truce elements present in a composition, but not affecting the compositions nature or characteristics would be permissible if present under the "consisting essentially of" language, even though not expressly recited in a list of items following such terminology. When using an open ended term in this specification, like "comprising" or "including," it is understood that direct support should be afforded also to "consisting essentially of" language as well as "consisting of" language as if stated explicitly and vice versa.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, "soft foam" means a foam that is softer than the "hard foam" and "hard foam" means a foam that is harder than the "soft foam." Those expressions should be interpreted flexibly and are interpreted relative to one another regardless of absolute hardness. The use of the terms, "soft" and "hard" alone are not meant to describe the compressive strength of the material, nor the materials ability to resist deformation and should not be interpreted in such a manner. Rather the terms "soft" and "hard" designate the relative relationship between the two types of foams presented within the disclosure.

As used herein, "polyurethane" means polymer composed of a chain of organic units joined by urethane links. Polyurethanes are formed by reacting an isocyanate with a polyol both of which contain an average two or more functional groups per molecule. By reacting two or more isocyanate groups per molecule ($R-(N=C=O)n_2$) with a polyol containing on average two or more hydroxyl groups per molecule ($R-(OH)n_2$) in the presence of a catalyst in a hydrophilic environment, a flexible polyurethane foam can be produced.

As used herein, "silicone rubber" is an elastomer composed of silicone polymer containing silicon together with carbon, oxygen, and hydrogen and are sometimes also referred to as siloxanes. Silicone rubbers are often one or two parts polymers, are stable, and resistant to extreme temperatures and environments (e.g., −55° C. to +300° C.). The siloxane rubber presented herein is a flexible polymer. When compared to a polyethylene backbone, the siloxane rubber is much more flexible because the bond length between the units is longer and the individual units can move farther and easily change conformation.

As used herein, silicone is an adhesive gel or liquid and must be cured, vulcanized, or catalyzed. Silicone rubber can be cured by a platinum-catalyzed addition cure system, a condensation cure system, and a peroxide cure system, or an oxime cure system. In one embodiment, a platinum-catalyzed cure system can be used where two separate components are mixed to catalyze the polymer: one component can include a hydride-and a vinyl-functional siloxane polymer that can be mixed with a platinum complex creating an ethyl bridge between the two. A platinum based system can have high tear strength and dimensional stability, can have high resistance to high temperatures, and can be safe for the environment, nontoxic, and odorless.

In another embodiment of this disclosure, a tin-based cure system can be used as a substitute in the presence of an alcoxy crosslinker and silicone polymers. Once the crosslinker is hydrolyzed, it can expose a hydroxyl group at its end which then participates in a condensation reaction with another hydroxyl group attached to the actual polymer. The presence of a tin catalyst is not necessary but it can speed up the curing/crosslinking process. Similarly, a peroxide based system can be used. Other polysiloxane rubber polymers such as polydimethylsiloxanes, organofunctional polydimethylsiloxanes, or siloxane polyether co-polymers can be used as substitute.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and subrange is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5, " which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support means-plus function are expressly recited in the description herein. Accordingly, the scope of the invention should be determined solely by the appended claims and their legal equivalents, rather than by the descriptions and examples given herein.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Multi-Layered Ballistic Armor

Figure 2:
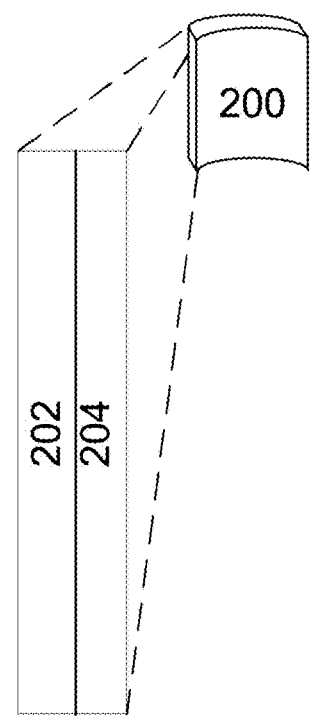
FIG. 2 is a schematic illustration showing a cross-section of layers in a multi-layered ballistic armor having two layers in accordance with an embodiment of the present technology.

The multi-layered ballistic armor 100 can generally have a contoured panel shape such as that illustrated in FIG. 1. FIG. 2 shows a side cross-sectional view of a multi-layered ballistic armor panel 200 which can include a layer of a polyurethane foam material 202, and a layer of a ballistic impact absorption material 204. The polyurethane foam material can include a polyurethane formed from an isocyanate and a polyol; a polymerization reaction initiator that is an isoprenoid compound; and a polymerization reaction accelerator. The polyurethane foam can be a flexible soft foam, a flexible hard foam, or a composite thereof.

Soft Polyurethane Foam

In some embodiments, the layer of the polyurethane foam material can include soft polyurethane foam ("soft foam"). A soft foam can be formed from a unique composition of polyurethane (formed from an isocyanate and a polyol), a polymerization reaction initiator, and a polymerization reaction accelerator. In order to create the soft foam, the polymerization reaction initiator and the polymerization reaction accelerator, along with the optional gelling agent, surfactant, and reinforcement filler can be added at room temperature to the polyurethane.

The polyurethane can be manufactured as a product of a reaction of two raw materials, a polyol and an isocyanate. In one embodiment the isocyanate can be a polyfunctional isocyanate. In another embodiment, the polyol can be a polyether polyol and the isocyanate can be a methylene bisphenyl isocyanate. The general reaction between a polyol and a polyfunctional isocyanate to form the polyurethane is shown below.

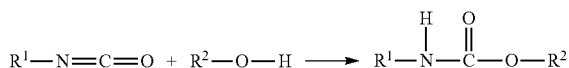

In the equation above, each $R^1$ group can have multiple isocyanate groups; thus, there can be a high degree of cross-linking in the polyurethane. As the raw materials are combined, the reaction can generate bubbles and the mixture expands. Once the reaction is complete, the raw materials can be converted to a usable product.

In some embodiments a separate blowing agent can be added to the reaction. However, this is often not necessary since the polymerization reaction forms gases which can contribute to forming the foamed product. When used, the optional blowing agent can control foam density. As a general rule, foam density can be controlled by increasing the content of blowing agent, such as water. Although specific amounts of blowing agent can vary depending on the agent, most often the blowing agent can be present at from 1 to 3 volume % of the reactants.

In one embodiment, water can be added as a blowing agent and as a catalyst. In one embodiment, the catalysts that can be used in the reaction include tertiary amines and organotins. Exemplary tertiary amines can comprise N-methylimidazole, N-methylmorpholine, N-ethylmorpholine, triethylenediamine, triethylamine, tributylamine, triethanolamine, pentamethyldiethylenetriamine, pentamethyldipropylenetriaamine, dimethylethanolamine, and bisdimethylaminodiethylether. Exemplary organotins can comprise water, acetone, pentane, liquid carbon dioxide, HFC, HCF, CFC and methylene chloride. In one embodiment the polymerization reaction catalyst can be platinum.

In another embodiment a methylene bisphenyl isocyanate (MDI) solution (commercially available as Polytek® (Polytek Development Corp.)) and a mixture of polyether polyol can be mixed in a hydrophilic environment. In one example, the MDI and polyether polyol can be mixed in a volume ratio of about 1:2, to form polyurethane. In another example, the MDI and polyether polyol can be mixed at a volume ratio ranging from about 5:1 to about 1:5.

The polyurethane component can be present in the polyurethane foam material at varying amounts. In one example, the polyurethane can be about 50% to about 95% by volume. In another example, the polyurethane can be about 66% to about 87% by volume of the polyurethane foam material. In a further example, the polyurethane can be about 70% to about 85% by volume.

In yet another embodiment, the polyurethane foam can be composed of methylene bisphenyl isocyanate, polyether polyol, natural pine rosin, a polymerization reaction accelerator, an alginate-containing hydrogel powder, fumed silica, charcoal, and hydoxyethyl cellulose. In a further embodiment, the charcoal can optionally be substituted for, or used in combination with, carbon black and the polyurethane foam can further include a natural and synthetic rubber, polysulfide polymer, and silk fibroin.

The flexible polyurethane foam material can provide improved impact absorption and resilience while being light weight. This foam can have a shore hardness value from 15 A to about 40 A. In one example, the foam can have a shore hardness value of about 30 A. The polyurethane foam can be capable of repeatedly absorbing shock without structural damage.

Hard-Foam-Polyurethane Foam-Polyorganosiloxane Co-Polymer

In some embodiments, the polyurethane foam layer comprises a hard flexible foam. The hard foam can be created by combining the soft foam above with a polyorganosiloxane. The combination of the soft foam with a polyorganosiloxane can result in a flexible and tough open cell polyurethane/polyorganosiloxane foam. In one example, the hard flexible foam can have a shore hardness value of about 85 A. In some embodiments, the hard foam can have a shore hardness value ranging from about 50 A to about 100 A.

To create the hard flexible foam, the polyurethane foam from above, can be combined with a polyorganosiloxane and a polymerization catalyst. In one embodiment the polyorganosiloxane can be Soma-Foama® 15 (Smooth-On Inc.) and can comprise from about 5% to about 10% by volume. In some of embodiments the polymerization catalyst can be platinum or benzyl alcohol. In one embodiment, the polyurethane foam layer comprises from about 66 wt % to about 87 wt % polyurethane and from about 8 wt % to about 25 wt % of the polyorganosiloxane. In one embodiment, the polyurethane foam can be present in a first portion, the polyorganosiloxane can be present in a second portion and the portions can be cross-linked together in a hydrophilic environment to form a composite hard flexible foam. In some embodiments, the first portion can have a density of about 4 lbs/ft$^3$ and the second portion can have a density of about 15 lbs/ft$^3$.

The polyorganosiloxane can have two amine or polarized hydroxyl groups attached via a linkage group to one end of the compound. This end group can be capable of cross-linking with polyurethane, various other polyols, and cross-linker molecules. In one embodiment, the polyurethane and the polyorganosiloxane can be cross-linked to one another in a common layer using a cross-linker.

In one embodiment, the organosiloxane can have one or more isocyanate—reactive functional groups. In some embodiments, the polyorganosiloxane component has the following formula:

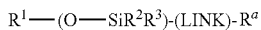

where $R^1$ is a terminal group; $R^2$ and $R^3$ can be organic groups such as methyl, ethyl and phenyl groups; the inorganic silicon-oxygen backbone n is about 1,000-5,000 repeating units long. LINK is a linking group (shown above as un-bracketed SiR$^2$R$^3$ group), and $R^a$ is -hydroxyl or amine group. In some cases, the organic side groups ($R^2$ and $R^3$) can be used to link two or more the silicon-oxygen backbones together. One example of a linking group is the alkylene group which can have one or more sulfur atoms, nitrogen atoms, or oxygen atoms substituted for a backbone carbon atom. In one embodiment the $R^1$-terminal group can be a trialkylsilyl group ($R_3$Si-groups). In another embodiment the $R^1$ terminal group can be RR$_2$Si-groups. One specific embodiment of the RR$_2$Si-group is a butyldimethylsilyl (BuMe$_2$Si—) group. The silicone atom can have at least one bond to an organic molecule. In one example, the silicon bond organic molecule can be referred to as siloxane polymer (—R—SiO—). In one example, the organic group found on the silicon atom can be methyl. In another example, other functional groups, such as hydroxyls and amines can be present based on the specific cure chemistry of a formulation.

The cross-linker can be selected from the group consisting of ethylene glycol, zinc-oxide, sulfur, 1,4-butanediol, 1,6-hexanediol, cyclo-hexanedimethanol, hydroquinone bis(2-hydroxyethyl)ether (HQEE), and combinations thereof.

The polymerization catalyst can be platinum, although other catalyst cure system can be used such as a tin based cure system, a peroxide based cure system, or an oxime based cure system can be used. In one example, a platinum cure system can be used and the reaction can be accelerated by heat in the presence of only ppm of platinum.

If a silicon polymer is used in the hard foam, then the silicone polymers can be reinforced with fillers such as fumed silica and polysulfide polymers. In one embodiment, a hydrophilic and polarized silicone elastomer can be cross-linked with another polymeric silicone and with polyurethane polymer. This can allow the silicone polymers, Si—H group to react with the free hydroxy group of a polyurethane polymer and a cross-linked Si—O—polyurethane can be achieved. In the case of a Si—OH group or Si—NH$_2$ group, reaction with an electrophilic group on a polyurethane compound such as isocyanate, ester group or other electrophilic group can result in a cross-linked elastomer-polyurethane composition.

In one example, a silicone elastomer containing at least one functional group (Si—H, Si—OH, NH$_2$, Si—C═C group) can be mixed with a polyurethane containing at least one reactive functional group (OH, NH$_2$, methacrylate or olefin vinyl group) to form a cross-linked silicone elastomer/polyurethane polymeric material.

The resultant cross-link structure produced by the chemical interaction of isocyanate group of polyurethane chain and the hydroxyl group of polymethylphenylsiloxane is a hydroxyl functionalized polyorganosiloxane.

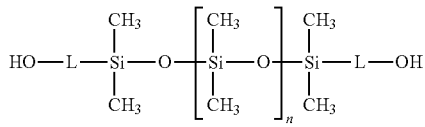

Where L represents either a bond or a linking group selected from divalent hydrocarbons having 1 to 10 carbon atoms. An exemplary embodiment of the hydroxyl functionalized polyorganosiloxane with an exemplary divalent hydrocarbon linking group is shown below.

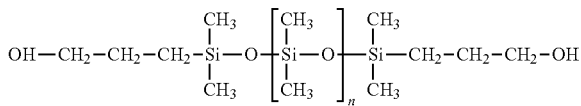

The polarized hydroxyl functionalized polyorganosiloxane can be combined with a polyurethane polymer to form a di-functional or multifunctional polyorganosiloxane/ diisocyanate flexible cross-linked polymer. The example of the di-functional or multifunctional polyorganosiloxane/diisocyanate cross-linked polymer below does not exemplify the linking group but rather lists the linking group as L.

Polyurethane Polymer

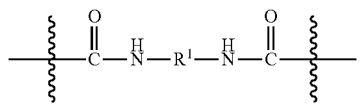

Di-Functional or Multifunctional Polyorganosiloxane/Diisocyanate Crosslinked Polymer

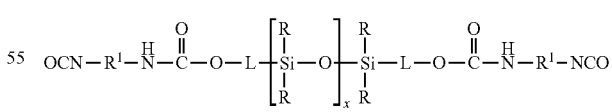

This polymeric material can then cross-linked with a thiokol polysulfide polymer, cis 1,4 polyisoprene, polybutadiene, polystyrene-block-polybutadiene-block-polystyrene and silk fibroin in the presence of ethylene glycol, abietic acid, diterpenes, N-hydrogel (available from Polytek Development Corp.)), fumed silica (available from Polytek Development Corp.), carbon black, sulfur, stearic acid and zinc oxide. The entire mixture can then be mixed vigorously at room temperature inside a chemical hood and poured directly into a mold in the shape of the desired product. The reaction is typically immediate and violently exothermic with repeated rise and collapse of the form mixture. In one example, the mixture can rise two times before a final third rise at which point the exothermic polymerization chain goes to completion. Once this final third rise occurs, polymerization proceeds to completion and the hard open cell polymerized foam takes its final shape and density at room temperature. In one embodiment the polymerization reaction process can require 2-6 hours to cure. In one example, the polyurethane foam can include methylene bisphenyl isocyanate, polyether polyol, and isocynate, and combined to the polyorganosiloxane, with a natural pine rosin polymerization reaction initiator, a polymerization catalyst, a polymerization reaction accelerator. In another example, the composition can farther include alginate-containing hydrogel powder, fumed silica, carbon black, and hydoxyethyl cellulose. To improve tear strength of the final product, a polysulfide polymer solution containing carbon black, 2-ehylhexyl diphenyl phosphate and polysulfide polymer from Smooth-on Inc. can be added to the mixture. In one example the polysulfide polymer solution can be added at about 8 volume %.

Polyurethane and Polyurethane/Polyorganosiloxane Foam Composite Material

In some embodiments the soft polyurethane foam and the hard polyurethane foam can be cross-linked to one another in a hydrophilic environment to form a composite flexible foam material which can be used as the polyurethane foam layer of the ballistic armor. In one embodiment the layers may be adjacent to each other. In another embodiment one layer can be fully or partially surrounded by the other layer. In yet another embodiment, the layer can involve a combination of a fully or partially surrounded layer and additional adjacent layers. The actual layering will vary based on the desired product and the shape of the mold.

In order to create the combined layers, one layer can be polymerized to completion in a mold, then the other layer can be chemically fused to the first layer. The fusion occurs naturally because of polymer cross-linking between the soft polyurethane foam and the hard polyurethane foam (polyurethane/polyorganosiloxane composition) in a hydrophilic environment. The end product is a one-piece foam composed of a soft flexible polyurethane foam portion and a hard flexible polyurethane foam portion. The differing portions can be arranged as adjacent layers and/or as a composite structure having various shapes. If the desired product contains a combination layer, then after the first layer is cured a cutting machine can be used to accurately cut and allow for removal of a portion of the first cured layer. The removed portion can then be filled with the second layer and allowed to cure. In some embodiments a water jet cutting machine can be used to accurately cut and allow for removal of the first layer.

In one embodiment the hard and flexible polyurethane foam (polyurethane/polyorganosiloxane composition) can be poured into the mold first and allowed to cure. Then the soft polyurethane foam can be added to the mold and allowed to cure. This method can create a hard polyurethane foam (polyurethane/polyorganosiloxane) outer layer and a soft polyurethane foam inner layer. In another embodiment the soft polyurethane foam can be added to the mold first and allowed to cure. Then the hard polyurethane foam (polyurethane/polyorganosiloxane composition) can be poured into the mold and allowed to cure. This method can create a polyurethane outer layer and a polyurethane/polyorganosiloxane inner layer.

In one embodiment, the composite material can comprise the polyurethane foam from about 70 wt. % to about 85 wt. % and the polyorganosiloxane at about 8 wt. % to about 25 wt. % of the composite material. In another embodiment, the soft polyurethane foam can have a density of about 4 lbs/ft$^3$ and the hard polyurethane foam (polyurethane/polyorganosiloxane) can have a density of about 10 lbs/ft$^3$. Although variations can be made, the composite foams can have a hard foam to soft foam hardness ratio ranging from about 1.25 to about 7, in some cases ranging about 2 to about 4, and in one specific aspect about 2.8.

The two fused layers can be used as an impact protective device. When used in impact protective devises the fused layers help to severely reduce concussion, skull and brain injuries.

In yet another alternative aspect, the polyurethane foam material can further include as an addition a polysulfide rubber polymer capable of crosslinking. In one example, the tear strength of the final product can be improved by further incorporating a polysulfide polymer solution. In one example, the polysulfide polymer solution can include carbon black, 2-ethylhexyl diphenyl phosphate (a plasticizer) and polysulfide polymer from Smooth-on Inc. In one aspect the polysulfide polymer solution can be added to the polyurethane and to the polyurethane/polyorganosiloxane mixture at 8 volume %. When added, the polysulfide polymer can be further crosslinked with the polyurethane and polyorganosiloxane to create a polysulfide/polyorganosiloxane/polyurethane foam of high resiliency and tear strength.

Although variations can be made, the polyurethane portion can include from about 70 vol. % to about 86 vol. % of the material. Similarly, the polyorganosiloxane can often comprise from about 5 vol. % to about 25 vol. % of the material. Further, the polysulfide polymer solution can often comprise about 5 vol. % to about 25 vol. % of the material. Of particular interest are compositions having from 80 vol. % to 86 vol % polyurethane, 7 vol. % to 10 vol. % polyorganosiloxane, and 7 vol. % to 10 vol. % polysulfide.

Initiators and Accelerators

During the formation of the soft polyurethane foam and the hard (polyurethane/polyorganosiloxane) foam composition a polymerization reaction initiator and a polymerization reaction accelerator can be used. The concentrations of polymerization reaction initiator and polymerization reaction accelerator used in the formulations will vary depending upon the desired use for the foams. The embodiments herein are presented solely as examples and should not be thought of as limiting the disclosure.

Polymerization Reaction Initiators

In some embodiments, the polymerization reaction initiator can be an isoprenoid compound. Non-limiting examples of suitable initiators include abietic acid (a diterpene), camphor (a monoterpene), menthol (a monoterpene), natural liquid tree rubber (a polyisoprene), amyrin (a pentacyclic triterpene), and combination thereof. In one example the polymerization reaction initiator can be abietic acid. In another example the polymerization reaction initiator is abietic acid that can be derived from pine resin.

Abietic acid (also known as abietinic acid or sylvic acid) is an organic compound that occurs widely in trees and is a primary component of resin acid. Abietic acid belongs to the abietane diterpene group of organic compounds, which are derived from four isoprene units, and have the molecular formula, $C_{20}H_{30}O_2$. Diterpenes form the basis of biologically important compounds such as retinol, retinal, and phytol. These diterpenes are carboxylic acids and initiate polymerization reactions due to active hydroxyl and hydrogen groups. The high polarity of the diterpene, abietic acid also permits compatibility with polyurethane polymers. Due to hydrogen bonding interactions with other polymers in the reaction, diterpene molecules contribute to further reinforcement of the polyurethane chain by supplemental cross-linking and long chain polymer formation. The greater the hydroxyl content in the diterpene compounds, the more hydrogen bonds between the diterpene and the isocyanate group. Hydrogen bonds between a diterpene (abietic acid) and an isocyanate can function as a physical cross-link at room temperature to provide higher shear and cohesive strength and an increase in heat resistance.

Abietic acid can be obtained from *Pinus kesiya royle* (khasi pine), *Pinus strobus* (Eastern white pine), *Pinus Insularis* (Southern pine), *Pinus sylvestris* (Scots pine), *Pinus ponderosa* (Ponderosa pine), *Pinus contorta* (lodgepole pine), and other sap extracts. Abietic acid can be obtained from pine rosin, also called colophony or Greek pitch, in a solid form of resin obtained from tree pine. Rosin is the nonvolatile portion of the oleoresin of members of the pine family and is the residue left over after the isolation of turpentine. Pine rosin has a primary chemical composition including methyl sandaraco pimaric, methyl isopimaric, methyl palustric, methyl dehydroabietic acid, methyl abietic, methyl neoabietic, and methyl merkusis acids. The highest component in pine rosin is methyldehydroabietic acid (27-28%)

Reactive hot melt of filtered liquid pine or lodge pole rosin containing abietic acid can be added to the composition at about 2 wt % to about 10 wt %. At room temperature, rosin is soft, sticky and can be brittle but melts when heated at around 85° C. Commercial abietic acid is available and is a glassy partly crystalline yellowish solid that melts at temperatures as low as 85° C. and can be purchased and used as a substitute for pine rosin abietic acid. Suitable ranges for the reaction initiator include from about 2% to about 6% by volume, from about 4% by volume to about 5% by volume or from about 2% to about 10% volume.

Polymerization Reaction Accelerators

In some embodiments, a polymerization reaction accelerator is combined with the soft and hard polyurethane foams discussed above. Non-limiting examples of suitable accelerators include charcoal, activated carbon, diamonds, fullerenes, graphites, coke, coal, carbon black and combinations of these materials. Accelerators of interest include activated hardwood carbon, charcoal, and carbon black. In one embodiment the polymerization reaction accelerator can be charcoal.

In another embodiment, the polymerization reaction can be activated hardwood carbon and charcoal. Activated carbon is carbon that has been treated with oxygen, and is a highly porous material and extremely high surface area. Activated pure hardwood carbon behaves as accelerator in the polymerization mix by decreasing the time of the cross-linking reaction. It also works as a strong filler-matrix interaction. If charcoal is used as an accelerator, $C_7H_{40}$ can be used. Charcoal is light black residue consisting of 85.5% to 98% carbon and residual ash. Regardless, specific types of charcoal can vary and suitable variations can include, but are not limited to, lump charcoal, pillow shaped briquettes, hexagonal Sawdust Briquette charcoal, extruded charcoal, Japanese charcoal and combinations of these materials. Each charcoal type contains varying amounts of hydrogen and oxygen.

In one example, the accelerator for the polyurethane/polyorganosiloxane composition can be carbon black. Carbon black is a para-crystalline carbon. In addition to being used as an accelerator, carbon black can be used as a filler.

When added to the composition, the polymerization reaction accelerator can comprise from about 2 wt % to about 3 wt % of the polyurethane foam. In some embodiments the polymerization reaction accelerator can comprise from about 1 wt % to about 7 wt % of the polyurethane foam.

Optional Foam Additives

The soft polyurethane foam and the hard (polyurethane/polyorganosiloxane) foam can optionally be prepared with at least one of: a gelling agent, emulsification control agent, a reinforcement filler, rheology modifiers, slip agents, emollients, humectants, or any combination of these additives. The concentrations of optional gelling agent, emulsification control agent, reinforcement fillers, cross-linkers and reinforcement polymers used will vary depending upon the desired use for the foam. The embodiments herein are presented solely as examples and should not be thought of as limiting the disclosure.

Gelling Agent

Gelling agents are thickeners that form a gel, dissolving in the liquid phase as a colloid mixture and forming a weakly cohesive internal structure. There are many suitable gelling agents. Non-limiting examples of suitable gelling agents include: alginate containing hydrogel powder, acacia, alginic acid, bentonite, Carbopols® (now known as carbomers), carboxymethyl cellulose, ethylcellulose, gelatin, hydroxyethylcellulose, hydroxypropyl cellulose, magnesium aluminum silicate (Veegum®), methylcellulose, poloxamers (Pluronics®), polyvinyl alcohol, sodium alginate, tragacanth, hyaluronan, polyethylene, carrageenans, polypropylene glycol, agar and polyvinylpyrrolidone, polyacrylic acid, hydrocolloid polyesters, chitosen, collagen, xanthan gum, and combinations thereof. In one embodiment the gelling agent can be an alginate containing hydrogel powder.

Though each gelling agent has unique properties, some gelling agents are more soluble in cold water than in hot water; others require a "neutralizer" or a pH-adjusting chemical to create the gel after the gelling agent has been wetted in the dispersing medium; most require 24-48 hours to completely hydrate and reach maximum viscosity and clarity. Gelling agents can typically be used in concentrations from about 0.5 wt % to about 10 wt %. In one embodiment the gelling agent comprises from about 4 wt % to about 6 wt % of the polyurethane foam material.

One example gelling agent is alginic acid containing hydrogel powder. For example, Hydrogel-N powder (commercially available as Polytek®), contains a mixture of magnesium carbonate, alginic acid, sodium pyrophosphate, and calcium sulfate, and can be added to the polyurethane mixture at room temperature at a volume ratio of about 4% to about 6% by volume, and in some cases about 2% to about 10% by volume at room temperature. Once the gelling agent is added to the mixture, polar hydrophilic groups are hydrated upon contact with water. The network then swells and exposes the hydrophobic groups, making the hydrophobic groups capable of interacting with water. This swelling process by interacting with the water molecules is then opposed by covalent or physical cross-links during gelation.

Hydrogel polymers can serve as chain extenders with the help of ethylene glycol and cations such as $Mg^{2+}$ and $Ca^{2+}$. Urea linkages are formed by the reactions between —NCO groups of the MDI bisphenyl isocyanate and water or —COO group of the alginic acid present in the hydrogel mixture. This chemical bonding further contributes to cross-linking and chain extension in the polymerization reaction.

Surfactants and Emulsifying Control Agents

In some embodiments the polyurethane foam material can further comprise at least one emulsion control agent (surfactant). Surfactants can be added to polyurethane and to polyurethane/polyorganosiloxane to emulsify the liquid components, regulate foam cell size, stabilize cell structure to prevent collapse during polymerization, and to fill subsurface voids. Various emulsification control agents can exhibit advantages such as use in recycling, cost reduction, mechanical properties and acoustic capability enhancement. Non-limiting examples of emulsification control agents can include fumed silica, silicone oil, nonylphenol ethoxlates, polydimethylsiloxane-polyoxyalkylene, polyethylene terephthalate, carbon nanotube, calcite, dolomite, calcium carbonate, and any combination thereof. In one embodiment the emulsification control agent is fumed silica (commercially available as Polytek®), a synthetic amorphous silicon dioxide. Emulsification control agents can be added to the polyurethane mixture at about 4 wt % to about 6 wt %, from about 4 wt % to about 8 wt %, and in some cases about 2 wt % to about 10 wt % of the polyurethane foam. The emulsifying agent can be added to the foam at room temperature.

Reinforcement Filler

Reinforcement filler can be added to the soft polyurethane foam and/or the hard (polyurethane/polyorganosiloxane) foam to enhance creep resistance and foam elastic modulus of the foams. Reinforcement fillers are capable of cross-linking and contribute to the increased resilience, toughness, and comprehensive strength of the material. Examples of such fillers include hydroxyethyl cellulose polymer, hydroxypropyl methyl cellulose, cellulose acetate, cellulose nitrate, hydroxyethyl methyl cellulose, ethyl cellulose, methylcellulose, natural tree rubber latex, synthetic rubber (i.e. polybutadiene), and hot-melt branched Polystyrene-block-polybutadiene, 30% styrene, 80% diblock, polysulfide polymers and combination thereof.

A cellulose fiber is composed of micro-fibrils where the cellulose chains are stabilized laterally by inter and intramolecular hydrogen bonding as well as hydrogen bonding to the isocyanate group and other newly formed polymers. Such hydrogen bonding serves as further reinforcement fillers in polyurethanes. In one embodiment hydroxyethyl cellulose polymer is used as the reinforcement polymer. The hydroxyethyl cellulose polymer is a modified, water-soluble polymer made by reacting ethylene oxide with alkali-cellulose. Hydroxyethyl cellulose can be added from about 0.5 wt % to 2 wt % of the polyurethane foam. Natural tree rubber latex can be used at about 1% by volume as a substitute or in conjunction with cellulose.

In one embodiment, the reinforcement filler can comprise about 0.2 wt % about 4 wt % of the polyurethane foam. As a general guideline, reinforcement fillers can comprise about 0.2 wt % to 10 wt % of the polyurethane foam material. In some embodiments the reinforcement filler can gave rise to novel and functional polymers and co-polymers Reinforcement Polymer In some embodiments, a reinforcement polymer can optionally be used to cross-link the soft polyurethane foam backbone to the hard (polyurethane/polyorganosiloxane) foam co-polymer, other polyols, and/or to each other. The reinforcement polymer can be chosen from: polysulfide polymer rubber, natural rubber, synthetic rubbers such as polybutadiene and polystyrene-block-polybutadiene-block polystyrene, pure silk fibroin and combinations thereof. In one embodiment the reinforcement filler can be a polysulfide. Where latex allergies are a concern, natural rubber can be omitted from the formulations.

Cross-linker

If desired, the soft polyurethane foam and/or the hard (polyurethane/polyorganosiloxane) foam can be formed in the presence of a cross-linker. Non-limiting examples of a suitable cross-linkers include ethylene glycol, zinc oxide, sulfur, 1,4-butanediol, 1,6-hexanediol, cyclo-hexanedimethanol, hydroquinone bis(2-hydroxyethyl)ether (HQEE), diethanolamine, diisopropanolamine, triethanolamine and tripropanolamine and combinations thereof. When the previously described polymerization mixture is mixed in the presence of ethylene glycol, unique and novel polymer polyols can be produced, which then serve as chain-extenders and cross linkers to the isocyanate chain. Such a composition can have a density of about five pounds per cubic foot, although other densities can be achieved based on variations of foaming and other factors.

It is notable that toluene diisocyanate, primarily used generally as a chemical intermediate in the production of polyurethane products, hexamethylene diisocyanate (HDI) and isophorone diisocyante (IPDI) are excluded from the composition in this invention even though they can be used as a substitute for 4,4' Methylene bis(phenylisocyanate) to produce polyurethane. In this invention, 4,4' Methylene bis(phenylisocyanate), MDI, is used.

Rubber Reinforcers

Further reinforcement can be achieved by further cross-linking the soil polyurethane foam composition and/or the hard (polyurethane/polyorganosiloxane) foam with a combination of liquid polysulfide polymer rubber, hot melt natural latex rubber melted at 350° F.), liquid polybutadiene rubber and hot melt styrene-butadine-polystyrene rubber (melted at 375° F.). The art of using a combination of natural and synthetic rubber contributes directly to the toughness and resilience of the polymerized end product and dramatically increases the load absorbing capacity generated by an impact force.

It is well known that the physical properties of elastomeric polymeric composition are improved by cross-linking or vulcanization as is the case of cross-linking natural rubber with sulfur. Available commercial elastomeric compositions such as polybutadiene, acrylnitrile-butadiene copolymer and styrene-butadiene copolymer have been modified to contain carbonyl groups distributed randomly along the length of the polymer chain. Cross-linking of these elastomers in polyurethane foam composition and/or the polyurethane/polyorganosiloxane composition occur by exposing the carboxyl group to zinc oxide and stearic acid in the mixture. Cross-linking of these molecules to the polyurethane/polyorganosiloxane co-polymers and to each other can give to novel large and long chain polymers that contribute to the high strength, resilience and impact energy absorption of the foam described in this invention.

Polysulfide Rubber

Polysulfides are a class of chemical compounds containing chains of sulfur atoms and can also be used in connection with the compositions herein. The polysulfide can be included as a mixture with the polyurethane, or as a separate adjacent layer. Two main classes exist: anions and organic of polysulfides. Anions have the general formula $S_n^2$ and are the conjugate bases of hydrogen polysulfides $H_2S_n$. Organic polysulfides have the formula $RS_nR$ where R is an alkyl or aryl (i.e. phenyl group). Polysulfide polymers can be synthesized by condensation polymerization reactions between dihalides and alkali metal salts of polysulfide anions.

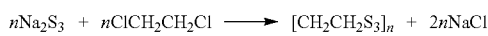

Polysulfide polymers are also prepared by the addition of polysulfanes to alkenes,

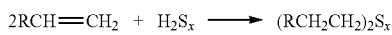

Sodium polysulfide, in which n has a value of around 4 has been used in the preparation of rubbery synthetic organic molecules called Thiokols. These molecules are formed by rings-opening polymerization reactions and possess long chains in which polysulfide groups alternate with small organic groups capable of forming two covalent bonds. These Thiokol molecules can be converted by heating with Zinc oxide into tough resilient materials used to make lining of storage tanks and hoses and in other applications requiring resistance to chemical and physical attack. Thiokols have also been used as solid fuels for rockets. In aqueous solution, these molecules have been used as protective coating for wood, metal, and concrete surfaces.

A typical Thiokol method of polysulfide synthesis is shown below:

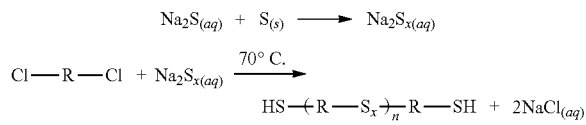

and the average structure of the liquid polysulfide polymer produced by such a reaction is as follows:

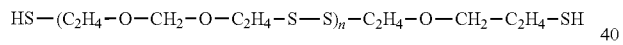

This polymer has terminal mercaptan (or thiol) groups and also has disulphide linkages within the backbone as used in this embodiment. These terminal mercaptan groups of liquid polymers are easily cross-linked by means of epoxide resins, inorganic or organic oxidizing agents and in this invention, it is crosslinked to the isocyanates. The result may be expressed as follows:

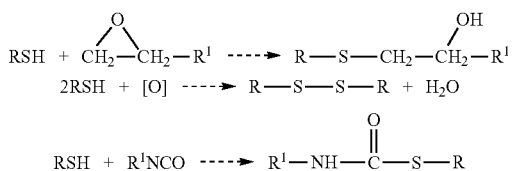

Furthermore, reacting a thiokol polysulfide polymer (Smooth—on polysulfide polymer 68611-50-7) which has 3 to 5 sulfur atom per molecule with an isocyanate like MDI and with various polymers described herein including but not limited to polyoligosiloxane, natural and synthetic rubber in the presence of a crosslinker leads to the formation of novel polymers within the polyurethane foam that contribute to a higher tear strength as observed in this embodiment.

Natural Rubber

Pure Natural rubber elastomers from the tree, *Hevea brasiliensis,* consists of polymers of the organic compound isoprene (cis-1,4 polyisoprene). This rubber can be melted at 350° F. in a melting furnace in a chemical hood and reactive hot melt is added at 2% by volume to the polyurethane foam composition and/or the polyurethane/ polyorganosiloxane composition before the addition of MDI. In polyurethane/ polyorganosiloxane composition, zinc oxide, stearic acid and sulfur are added to the mixture at 0.2% by volume before the addition of polyorganosiloxane and MDI. The 1,4 polyisoprene is capable of cross-linking to other polyols, to the polyurethane/ polyorganosiloxane co-polymer and to each other via sulfur cross-linking at temperature close to 150° C. during the polymerization reaction. This reaction contributes to the increased elasticity and rigidity to the final hard and soft product.

Cis-1,4 polyisoprene (polymers in pure natural rubber)

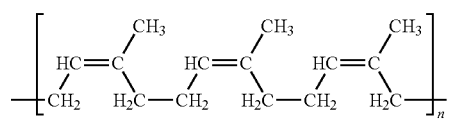

Vulcanized Rubber Chemical Structure

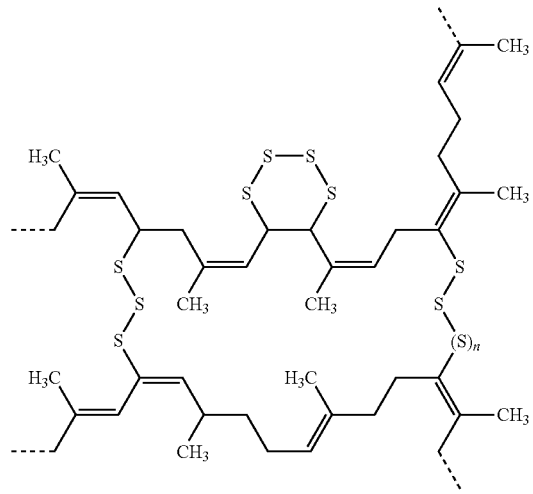

Above is vulcanized rubber with the addition of sulfur at 150° C. during the polymerization reaction of mixture. In applications where there exist latex allergy concerns, natural rubber may be omitted from the composition and only synthetic rubber can be used.

Synthetic Rubber

Synthetic rubber polymer, is any type of artificial elastomer synthesized from petroleum byproducts (monomers). Styrene-butadiene rubbers are derived from the copolymerization of 1,3 butadiene and styrene a used in this disclosure. These can be substituted with synthetic rubber prepared from isoprene (2-methyl-,3-butadiene), chloroprene (2-chloro-1,3-butadiene and isobutylene (2-methylpropene) cross-linked with a small quantity of isoprene. These products can then be mixed in various proportions to create products with a wide range of mechanical, physical and chemical properties which could be used as substitutes or additions to the synthetic rubber/s used in this disclosure.

In one embodiment of this invention, a platinum silicone rubber is used that has been modified with a reactive hydroxyl group capable a cross-linking with the polyol/polyurethane and rubber polymers. In another embodiment, a synthetic rubber polystyrene-block-polybutadiene-block-polystyrene (styrene 30 wt. %)—sigma Aldrich is heated at 375° F. in a melting furnace and the hot melt is added at a 2 volume % to the polyurethane and/or polyurethane/ polyorganosiloxane foam before the addition of polyoligosiloxane and MDI. This synthetic rubber is capable of cross-linking to the polyurethane backbone, polyurethane/polyorganosiloxane co-polymers, to other polyols, and other synthetic and natural rubber present in solution. By doing so, it adds rigidity and resilience and increases dramatically the compressive strength of the hard and soft foam.

Polystyrene-Block-Polybutadiene-Block-Polystyrene

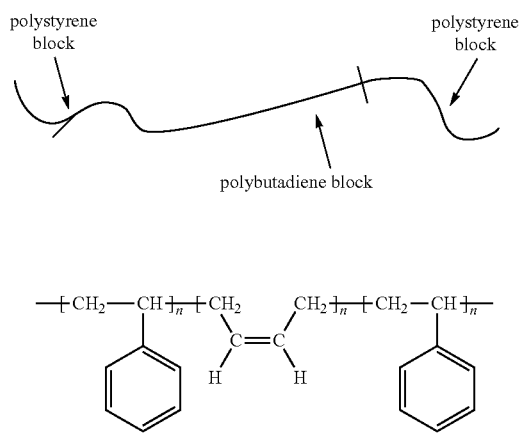

Figure 18:
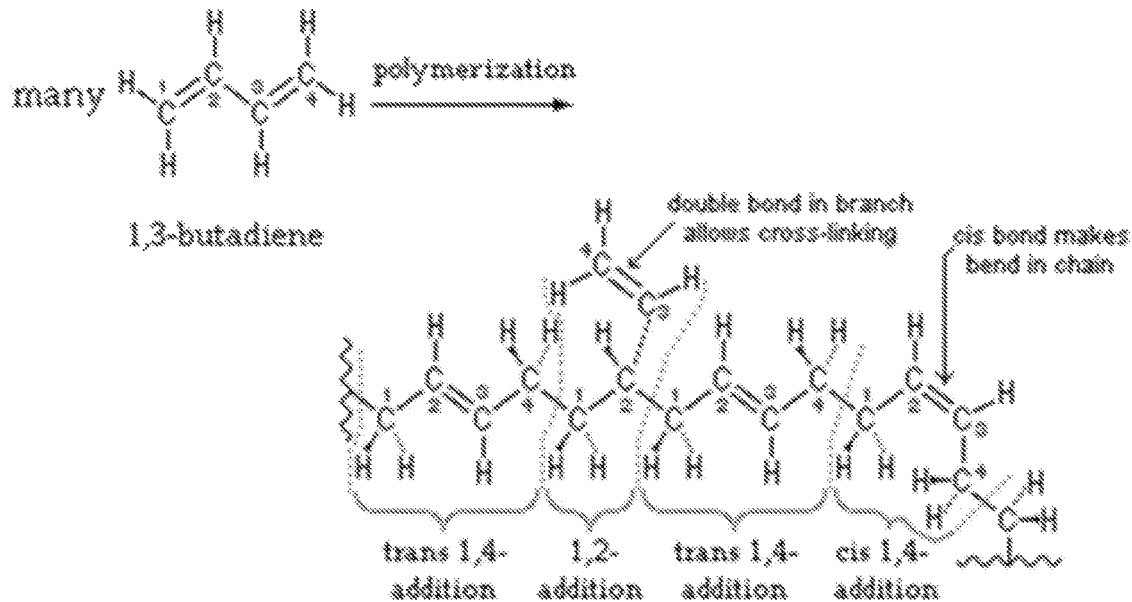
FIG. 18 is a n illustration of polymerization of 1,3-butadience to form polybutadiene.

In addition, a second synthetic rubber liquid and water soluble polarized hydroxyl terminated polybutadiene (Sigma—MW 3000)) capable of cross-linking in a hydrophilic environment is added to mixture 1 and 2 at a concentration of 4 volume %. The liquid polybutadiene is composed of: 72% cis -1,4; 27 % trans-1,4; and 1% vinyl. The liquid polybutadiene is capable of cross-linking the polyurethane backbone, to the polarized polyurethane/polyorganosiloxane co-polymer, to other polyols, and to rubber polymers present in solution. The addition of polybutadiene directly contributes to rigidity, comprehensive strength, resilience of the final hard and soft product as illustrated in FIG. 18.

Silk Protein

Silk consists of two main proteins, sericin and fibroin. Fibroin is an insoluble protein made by spiders, the larvae of *Bombyx mori silkworm,* other moths, and insects. In one embodiment of this disclosure, fibroin derived from the cocoon of the *Bombyx mori* silkworm is used. Silk fibers have exceptional strength. The strength occurs because of the layers of anti-parallel beta sheets. The primary structure of the silk fibron is a recurring sequence of poly(Gly-Ser-Glyc-Ala-Gly-Ala).

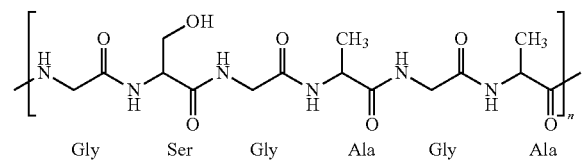

The high glycine and alanine content of each beta sheet allows for several beta sheets to be tightly packed with one another. The beta sheets are arranged so that the crystals alternate in alignment from sheet to sheet. The beta sheets are held together by hydrogen bonds that form between the individual sheets. Hydrogen bonds are weak bonds and not well known for their strength. It is the gradual failure of the hydrogen bonds in a slow and uneven manner that gives silk its considerable elasticity; this allows silk to bend and stretch before it breaks.

Purified silk fibroin in a liquid solution from different insect species has different amino acid arrangements; however most insect silks contain a common primary structural pattern. Therefore, while differences in arrangement may vary the location of the hydrogen bonds and the specific properties of the silk, any insect silk can be used as a substitute for *Bombyx mori* fibroin in this invention.

In one embodiment of this disclosure, the fibroin silk protein can be cross-linked to the polyurethane backbone, the polyurethane/polyorganosiloxane backbone, other polyols and/or to natural and synthetic rubber polymers and co-polymers. When fibroin is cross-linked to the structure of the polyurethane foam or the polyurethane/polyorganosiloxane foam the foam materials exhibit an increase in resilience and strength.

In another embodiment of the disclosure liquid fibroin is used to further increase the tensile strength and rigidity of the polyurethane or the polyurethane/polyorganosiloxane material. Specifically, silk fibroin (which can be acquired from Silktap Inc.) is dissolved in solution at 3% by volume and added to the polyurethane foam. Liquid silk fibroin can also be dissolved in a solution at about 1% to about 2% by volume and be added to the polyurethane/polyorganosiloxane material.

As used, in this disclosure the liquid silk fibroin was stored at 4° C. and used within two weeks. Using liquid silk fibroin quickly is important because the degree of breakage of the peptide chain is positively correlated with the storage time.

If the fibroin is added to either the polyurethane or the polyurethane/polyorganosiloxane composition along with MDI, urethane linkages are formed between the fibroin and the polyurethane pre-polymer. These urethane linkages further increase the mechanical strength and thermal stability of the composition. In this disclosure, the polyurethane linked fibroin polymers improve the mechanical properties and provide higher thermal stability to the modified polymers of the polyurethane.

Emollient/Humectant

In one embodiment, the polyurethane foam and/or the polyurethane/ polyorganosiloxane foam can include an emollient or humectant. Example emollients or humectants, include, but are not limited to include: hyaluronic acid, glycerin, glyceryl triacetate, sugar polyols, urea, and the like. In one embodiment of the disclosure, hyaluronic acid may be used to improve the tactile response and feel on surfaces of a final product. As a general guideline humectants can comprise from about 0.05% to about 4% by volume of the polyurethane or polyurethane/polyorganosiloxane foam compositions.

Stabilizer

In certain embodiments, it may be desirable to use a stabilizer when creating the foam compositions. Non-limiting examples of suitable stabilizers can include xanthum gum. Such stabilizers can comprise about 0.5% to about 5% by volume of the polyurethane and/or polyurethane/polyorganosiloxane foam compositions.

Colorant

As yet another option, colorants can be added to the polyurethane foam and/or the polyurethane/polyorganosiloxane foam compositions. Such colorants can include pigments, dyes, or other colored materials. For example, poly-color dyes (e.g. POLYTEK) can be added to the mixture during the polymerization reaction to create a colored foam, exemplary but not limiting foam colors include; blue, red or yellow. As a general guideline, colorants can comprise from about 0.01% to about 5% by volume of the composition. The exact amount will vary, depending on desired color intensity.

Polymer Polyols

In one embodiment the disclosure, the polyurethane foam material is comprised of: about 3 volume % pine rosin; about 2.7 volume % activated hardwood carbon or charcoal $C_7H_{40}$; 5.5 volume % Hydrogel-N (POLYTEK); about 6-8 volume % fumed Silica (Polytek®); about 0.5-1 volume % hydroxyethyl cellulose; 4 volume % of liquid butadiene (Sigma); 2 volume % of styrene-butadiene-styrene hot melt (375° F.); 2 volume % of natural latek rubber hot met (350° F.); 8 volume % polysulfide Thiokol polymer; and 0.2-0.5 volume % of natural pure silk fibroin (5% weight/volume solution from Silktap Inc. Cambridge Mass.).

In another embodiment the disclosure, the polyurethane/polyorganosiloxane foam material is comprised of: about 3 volume % pine rosin; about 2.7 volume % carbon black; 5.5 volume % Hydrogel-N (POLYTEK); about 6-8 volume % fumed Silica (POLYTEK); about 0.5-1 volume % hydromethyl cellulose; 4 volume % of liquid butadiene (Sigma); 2 volume % of styrene-butadiene-styrene hot melt (375° F.); 2 volume % of natural latex rubber hot met (350° F.); 8 volume % of polysulfide polymer; and 0.2-0.5 volume % of natural pure silk fibroin (5% weight/volume solution from Silktap Inc. Cambridge Mass.).

The above formulations when mixed at room temperature in a hydrophilic environment give rise to novel polymer polyols in a hydrophilic environment. These novel polymer polyols quickly bind to the isocyanate backbone of the polyurethane foam, to the isocyanate/polyoligosiloxane backbone of the polyurethane/polyorganosiloxane foam, and to each other, which results in intermediate and extensive cross-linking between the compositions.

The novel polymer polyols formed by the polymerization process above, increase the load bearing capacity of the low density and high resiliency of the flexible polyurethane and of the polyurethane/polyorganosiloxane foam and add toughness to the microcellular foam structure. In other words, the varied and novel polymer polyols that become chemically bonded to the polyurethane backbone of the polyurethane foam and to the polyurethane/polyorganosiloxane backbone of the polyurethane/polyorganosiloxane foam contribute to the unique high tensile strength, elongation, tear resistance and impact absorption.

Ballistic Impact Absorption Layer

The ballistic impact absorption layer can be a layer of any known ballistic impact material. In one embodiment, the ballistic impact material of the impact absorption layer can comprise one or more of para-amid synthetic fiber (KEVLAR (du Pont de Nemours and Company), TWARON (Enka B. V. Corp.)), ballistic ceramic (SICADUR), ultrahigh molecular weight polyethylene fiber woven fabrics (DYNEEMA (DSM IP) and SPECTRA (Allied Corp.)), synthetic woven fiber (GOLD FLEX (AlliedSignal Inc.)), ballistic metal or titanium, graphene, and combinations thereof. In some embodiments the ballistic impact absorption layer can comprise two or more of these ballistic impact materials.

Non-limiting, but exemplary para-amid synthetic fibers are a subgroup of nylons and can include poly paraphenylene terephthalamide; 3,4'-diaminodiphenylether-paraphenylenediamine-terephthaloyldichloride copolymer; p-phenylene terephthalamide; poly-metaphenylene isophthalamides; and combinations of these materials. Exemplary ballistic ceramics can include alumina, silicon carbide, boron carbide, aluminum oxide, titanium diboride ceramics, and combinations thereof. In one example, ultrahigh molecular weight polyethylene can comprise 100,000 to 250,000 monomer units per molecule. Exemplary synthetic woven fibers can comprise cross-laid fibers coated with a resin. The cross-laid fibers can comprise cotton fibers, polyethylene fibers, and/or aramid fibers.

In one embodiment the ballistic impact absorption layer comprises an ultrahigh molecular weight polyethylene (UHMWPE). In another embodiment the ballistic impact absorption layer can be multi-layered and can include a ceramic layer adjacent to a UHMWPE layer.

In another embodiment the ballistic impact absorption layer comprises a para-amid synthetic fiber. In some embodiments the para-amid synthetic fiber comprises polyparaphenylene terphtalamide (KEVLAR or TWARON). In one example, the polyparaphenylene terphtalamide can have a weight ranging from about 400 denier to about 7,500 denier. In another example, the polyparaphenylene terphtalamide can have a weight of at least 1,500 denier. In yet another embodiment the ballistic impact absorption layer comprises a ballistic ceramic. In one embodiment the ballistic ceramic layer comprises one or more of silicon carbide, boron carbide, and aluminum oxide.

A non-limiting example of ballistic metal can include ballistic titanium (e.g. grade 5 armor having thickness of 1, 2, 3, 4, or 5 mm).

Incorporating ballistic impact absorption layers, such as ballistic titanium, silicon carbide, KEVLAR layers, and UHMWPE layers, in a thin and light armor sealed by the flexible polyurethane open cell foam matrix for kinetic and impact energy absorption as described herein, can allow very high powered bullets, like armor piercing 30-06 or Winchester 308, to be stopped and retained within the ballistic impact armor. As such police officers, military servicemen, and other users can be provided with level III protection (rifle caliber bullets) in a thin armor polyurethane foam hybrid system, as opposed to level II or level IIIA. In some examples, the multi-layered ballistic armor can have an armor level rating of IIIA, or IV per NIJ-Standard-0101.6 as established by the National Institutes of Justice Ballistic-Resistance Body Standards and Testing Program. The armor level rating can correspond to the thickness and ballistic penetration properties of the armor.

In some embodiments the ballistic impact absorption layer can be a multi-layered assembly and can include two or more ballistic impact materials. In one example, layers in the multi-layered assembly can include a member of the group identified above. In another example, layers in the multi-layered assembly can include a ballistic ceramic layer and a para-amid synthetic woven fiber layer. In one example, the multi-layered ballistic armor can include a layer of polyurethane foam material adjacent to a layer of ballistic ceramic and the layer of the ballistic ceramic can be adjacent to a para-amid synthetic fiber layer. In another embodiment the ballistic impact absorption layer comprises at least two layers including a ballistic ceramic layer and an ultrahigh molecular weight polyethylene fiber woven fabric layer. In one embodiment the ballistic ceramic layer and the ultrahigh molecular weight polyethylene fiber woven fabric layer are adjacent to one another. In yet another embodiment the ballistic impact absorption layer comprises at least three layers including a ballistic ceramic layer, an ultrahigh molecular weight polyethylene fiber woven fabric layer, and a para-amid synthetic fiber.

Figure 3:
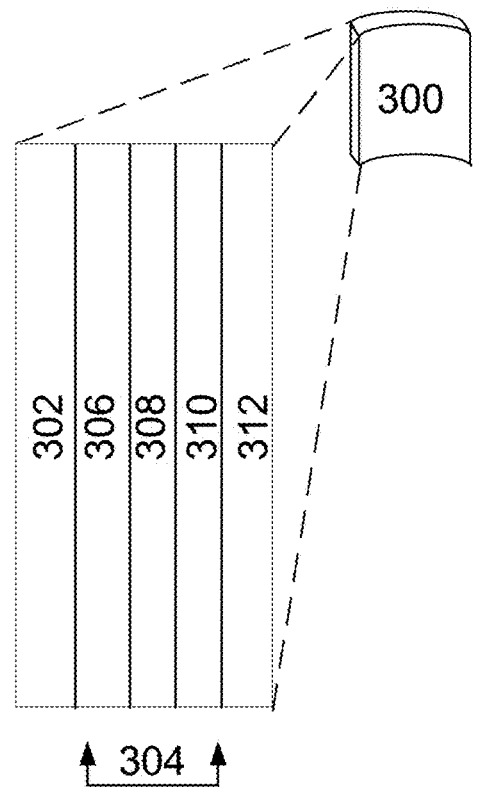
FIG. 3 is a schematic illustration showing a cross-section of layers in a multi-layered ballistic armor having five layers in accordance with another embodiment of the present technology.
Figure 4:
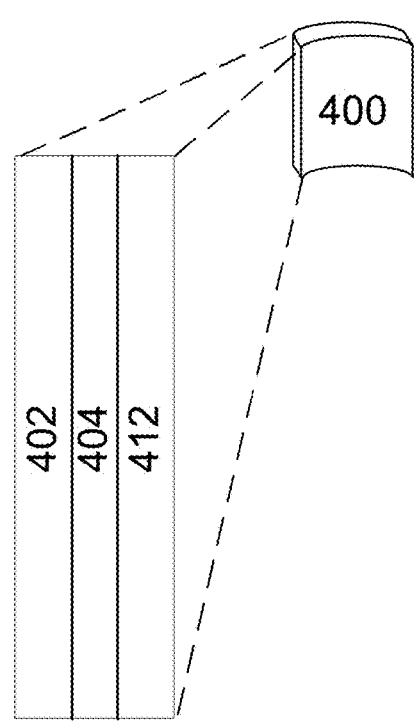
FIG. 4 is a schematic illustration showing a cross-section of layers in a multi-layered ballistic armor having three layers in accordance with yet another an embodiment of the present technology.

As shown in FIG. 3, in one example, the ballistic impact absorption layer 304 can be a multi-layered assembly that includes a ceramic silicon carbide layer 306, an UHMWPE layer 308, and a Kevlar layer 310, sandwiched between a first foam layer 302 and a second loam layer 312 to form the multi-layered ballistic armor 300.

Ballistic Armor Composition

As previously mentioned, the multi-layered ballistic armor disclosed herein comprises a layer of a flexible polyurethane foam material and a layer of a ballistic impact absorption material. The polyurethane foam material layer and the ballistic impact absorption material layer can be formed from materials as discussed above. Generally, the ballistic impact absorption material can act as a support and reinforcement layer while the polyurethane foam material can be oriented in a layer on an impact side of the multi-layered ballistic armor.

In some embodiments the multi-layered ballistic armor 400 can further comprises a second layer 412 of the polyurethane foam material and the ballistic impact absorption layer 404 can be disposed between the first layer of the polyurethane foam material 402 and the second layer of the polyurethane material 412. When a second layer of the polyurethane foam material is included, the first and second layer of the polyurethane foam material can have the same or different compositions. For example, a more rigid polyurethane foam material can be used on an outer (ballistic-facing) surface compared to a softer polyurethane foam composition on an inner surface. In this manner, the inner surface can act to buffer and absorb impact energy across a larger area to reduce energy transmitted to a user or underlying surface. In one embodiment, the polyurethane foam material comprises a hard (polyurethane/polyorganosiloxane) foam. In one example, the hard foam can have a compression modulus ranging from about 275 psi to about 425 psi. In another embodiment the polyurethane foam material can be a soft foam. In one example, the soft foam can have a compressive modulus ranging from about 10 psi to about 50 psi.

Figure 5:
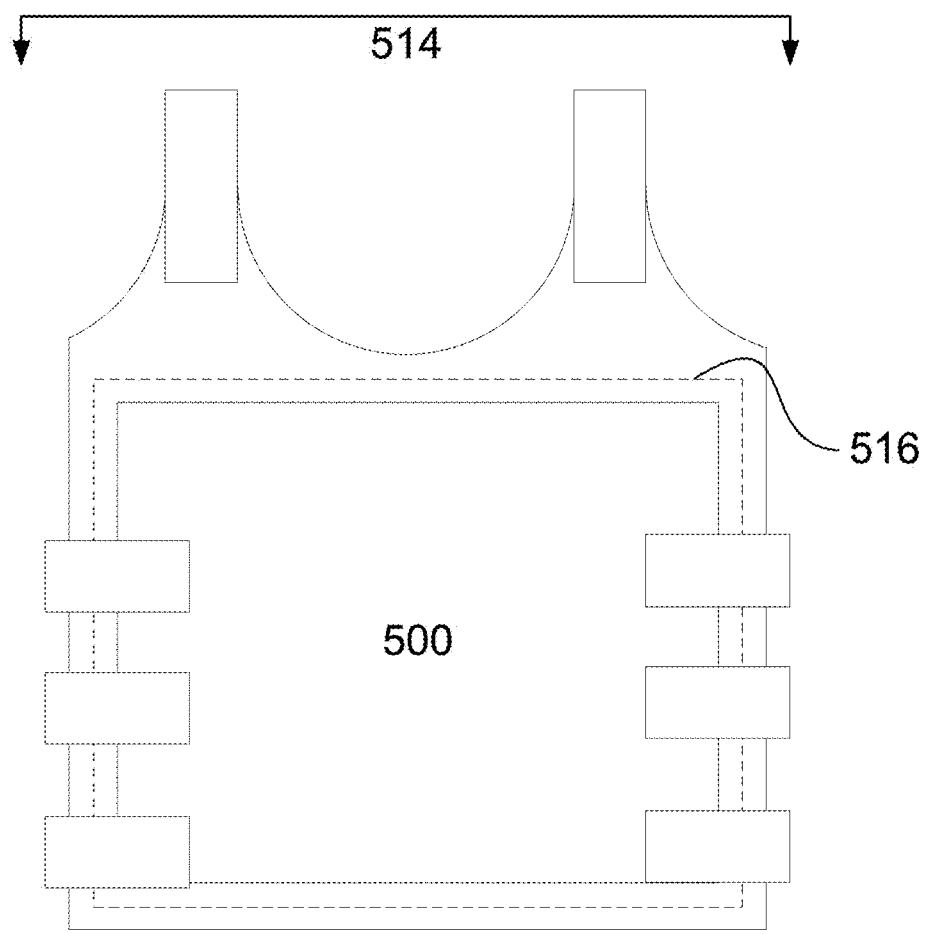
FIG. 5 is a schematic illustration of a bullet proof vest having a receiving pocket to retain a multi-layered ballistic armor formed as a panel in accordance with an embodiment of the present invention.

In one example, the multi-layered ballistic armor 500 can be positioned in a receiving pocket 516 of a bullet proof vest 514 as illustrated in FIG. 5. The receiving pocket can include one or more of a primary front pocket, back pocket, side pockets, shoulder pockets, lower hanging pockets, neck cuff shield pockets, and the like. In one example, the multi-layered ballistic armor positioned in the bullet proof vest can include a first layer of the polyurethane foam that has a thickness ranging from about 2 mm to about 4 mm and a second layer of the polyurethane foam ranging from about 3 mm to about 6 mm.

In another example, the multi-layered ballistic armor can be in the form of a ballistic panel. Thus, the multi-layered ballistic armor can also be shaped for use in any one of the above pockets. The ballistic armor can also be shaped for use in other locations such as, but not limited to, leg armor, shoulder armor, and the like. In yet another example, the ballistic panel can be incorporated into a ballistic vehicle panel and shaped for placement on a vehicle (e.g. doors, side body panels, engine compartment panels, etc.).

Method of Coating a Material to Form a Multi-Layered Ballistic Armor Panel

Also presented herein is a method of coating a material with a polyurethane foam to form a multi-layered ballistic armor. In one example, the method can include applying the polyurethane foam as an exterior coating to the material to form a coated material. The material can be a ballistic impact absorption material. The polyurethane foam and the ballistic impact absorption material can be as described above. In one embodiment the material is the exterior surface of a bullet proof armor panel. The bullet proof armor panel can comprise polyparaphenylene terephtalamide (KEVLAR). In one example, the coated polyparaphenylene terephtalamide (KEVLAR) panel can exhibit an armor level rating per NIJ-Standard-0101.6 as established by the National Institutes of Justice (NIJ) Ballistic-Resistance Body Standards and Testing Program (published July 2008 and is incorporated by reference) that is higher than the armor level rating of the same uncoated polyparaphenylene terephtalamide (KEVLAR) panel.

Exemplary Uses

The disclosed soft flexible polyurethane foam material and the hard (polyurethane /polyorganosiloxane) flexible foam can have wide and useful application. These foams are flexible and comfortable when in contact with vulnerable areas of the human body, are protective from impact damage, when crushed they geometrically can return to their original shape, and can be used in a variety ballistic armors. If desired the polyurethane foam can be infused and/or coated with all weather-water repellant and fire resistant sealant. Non-limiting examples of water repellant can include fluorinated ethylene propylene. Non-limiting examples of fire resistance sealant can include 3 M Fire Barrier Silicone Sealant. In some aspects, the polyurethane foam can substantially or completely encapsulate the ballistic impact absorption layer.

When used in combination with a ballistic impact absorption layer, theses foams can absorb impact shock, can protect the ballistic impact absorption layer from accidental damage, can reduce secondary impacts (e.g. bullets tend to be retained rather than reflected), and can prevent spalling and shrapnel of a bullet upon impact. Reduction in impact can also be accompanied by quick recovery with low or no rebound. Such quick recovery can aid users during multiple impact incidents and can allow for a quicker response by an impacted user. Furthermore, the polyurethane foam material can substantially reduce blunt trauma transmitted to underlying user or surfaces. These properties can be partially attributed to the open cell structure of the polyurethane foams.

During a single impact or during repeated impacts, deformation of the open cell polyurethane foam material occurs in which a portion of the soft segments, the polyol group which is covalently bonded to the hard segment of the polyurethane polymer, isocyanate is stressed by uncoiling. As a result, the hard segment, isocyanate, becomes aligned in the stress direction. This reorientation of the hard segment and extensive hydrogen bonding with the chain extender and cross-linkers described above contribute to high tensile strength, elongation, and tear resistance values of the polyurethane foam materials. The polyurethane foam and polyurethane/polyorganosiloxane foam combination can be formed in the shape of an impact absorption device.

The multi-layered ballistic armor can be used in bullet proof vests, bullet proof helmets, bullet proof shield, bullet proof body armor, armored vehicles, watercraft, aircraft bullet proof wall panels, bullet proof bags, and bullet proof mats. In all of these embodiments, the polyurethane foam material layer and the ballistic impact absorption layer can be as described herein. In one example the multi-layered ballistic armor can be in the form of a ballistic panel. In some embodiments the ballistic panel is curved. In another example the ballistic panel is contoured to align with the shape of a female chest.

FIG. 6A shows one example body panel 600 having a multi-layered structure. In this example, the panel is sufficiently flexible to allow for at least 55° of curvature as illustrated generally in FIG. 6B. In one example of FIG. 6C, the multi-layered structure can include a titanium layer 610 sandwiched between two polyethylene layers 612, 614. A ceramic layer 616 can be oriented on one of the polyethylene layers 612 on a strike side. Open cell foam layers 618, 620 can then sandwich the multi-layer structure as described herein. Furthermore, the metal (e.g., titanium) layer can include an optional scoring line 602. The scoring line can allow the panel to flex or segment the metal layer into multiple segments to allow for additional flexibility. In some cases, the scoring line 602 can form a distinct panel segment boundary (e.g. forming a gap as illustrated in FIG. 6C) while in other cases a single panel can be partially scored to allow improved bending along the scoring line. Generally, the gap can have a width of less than about 2 mm and most often about 1 mm. In another optional example as illustrated in FIG. 6D, the multi-layered structure can include a titanium layer 630 sandwiched between and adjacent to two polyethylene layers 632, 634. Open cell foam layers 636 and 638 can then be sandwiched about the polyethylene layers 632 and 634, respectively, on outer surfaces of the composite panel.

Figure 7A:
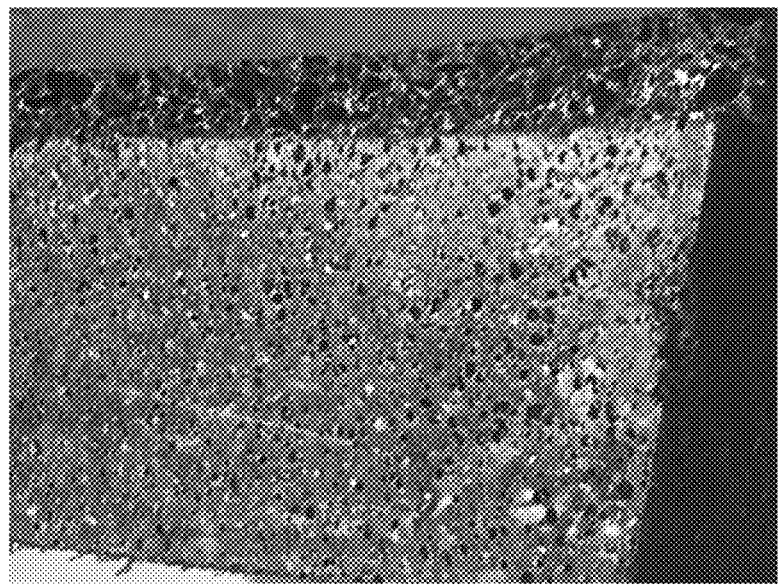
FIG. 7A is an image of one embodiment of a panel of a multi-layered ballistic armor showing foam porosity in accordance with an embodiment of the present technology.
Figure 7B:
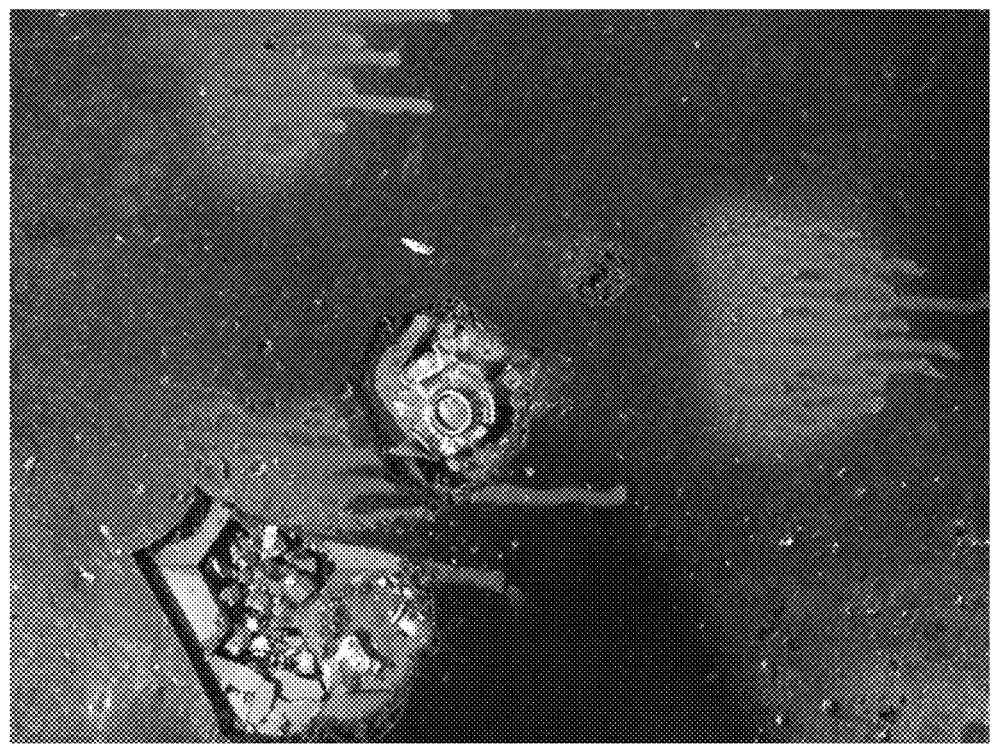
FIG. 7B is an image of one embodiment of a panel of a multi-layered ballistic armor with a bullet embedded therein in accordance with an embodiment of the present technology.

When incorporated into a bullet proof vest, the bullet proof vest can have an armor level rating of IIIA, III, or IV per NIJ-Standard-0101.6 as established by the National Institutes of Justice (NIJ) Ballistic-Resistance Body Standards and Testing Program. The armor level rating will vary based on the composition of the multi-layered ballistic armor composition and the thickness of the polyurethane foam layer. Typically, these ratings can be achieved using the polyurethane portions as described with total panel thicknesses ranging from about 15 mm about 30 mm, and most often from 12 mm to 32 mm. Multi-layered ballistic armors with thicker polyurethane foam layers can have higher armor ratings. In one example of a multi-layered ballistic armor composition a standard 308 bullet discharged at a range of about 3000 feet per second can become embedded in the polyurethane foam layer, as shown in FIGS. 7A and 7B.

In one example configuration, a multi-layered ballistic armor panel can include a titanium metal layer embedded in an aramid fiber resin (KEVLAR) as a ballistic impact absorption layer. The titanium metal can have a thickness from about 1 mm to about 5 mm and can be a substantially pure titanium metal sheet. The titanium sheet can be curved for body contour. The polyurethane foam can be coated around this ballistic impact absorption layer as an encapsulating layer. A silicone sealant can then be coated on the multi-layered ballistic foam composite material.

Protective Helmets

In protective helmets and helmet inserts, as in ballistic armor, the polyurethane and polyurethane/polyorganosiloxane foams along with a ballistic impact absorption layer can be fused together to form a protective shell inside the bullet proof helmet. In one embodiment the polyurethane/polyorganosiloxane foam is the outside layer. This outside layer is fused and cross-linked to the inner polyurethane foam. In another embodiment the polyurethane foam is the outside layer and is cross-linked to an inner polyurethane/polyorganosiloxane foam. In yet another embodiment the polyurethane and polyurethane/polyorganosiloxane foam can both exist in one of the layers. Each of the first and second foams can be independently selected from the polyurethane foam and the polyurethane/polyorganosiloxane foam these layers can be attached to a ballistic impact layer or can sandwich a ballistic impact layer. The structural shape of the materials can be chambered, triangular, circular, trapezoidal, or the like.

The composite liner can also include an inner layer which can act as a comfort layer and can also provide energy absorption and shock protection. The inner layer can be formed of any of the foams disclosed herein, although other foams and/or impact materials can be used. In one example, the inner layer can be a foam layer formed of materials such as, but not limited to, ethylene vinyl acetate (EVA), polyesters, polyethylene terepthalate (PET), piperazine, methylene phenylene isocyanate, polycarbonate, ethylene-propylene co-polymers, polyamides, polyethers, aramids co-polymers, and combinations thereof.

An optional reinforcement layer, can also be placed and crosslinked along an outer surface of the single foam layer. The reinforcement layer can be a hard layer, in one example. In one example, the hard layer can be composed of polarized polyurethane/polyorganosiloxane foam or polyurethane/polyorganosiloxane/polysulfide foam as described herein. A fabric or other suitable layer can then allow securing to the hard/soft shell (e.g. hook-and-loop, or the like) to the helmet inner surface of the rigid hard shell. An inner perforated layer can also be oriented on an inner surface of the foam layer to provide additional moisture wicking, breathability, or other benefits to the wearer. Non-limiting examples of the inner perforated layer with ventilation holes can include a cotton, polyester, mesh fabric, flexible polyurethane, blends of natural and synthetic fibers, and combinations thereof that can repel moisture, pulling it off the skin and into the fabric.

When foam blocks of varying thickness and length are added and placed strategically inside the polycarbonate/fiberglass or carbon fiber hard shell helmet over a space extending from the forehead to the back of the head, the impact force is absorbed by the fibrous open cell polymers during compression. As a result, the damaging impact from perpendicular and rotational forces takes longer to reach the user's head thus enhancing absorption and dissipation. This decreases or eliminates the chances of a brain concussion during sports activities. The two layer open cell system polymers in their three-dimensional arranged structure are extremely capable of absorbing high and repeated impacts without deformation.

In another example the multi-layered ballistic armor can be incorporated into a ballistic vehicle component. The ballistic vehicle component can be in the shape of a panel for placement on or in a vehicle. In some embodiments the ballistic vehicle component can be utilized in a door or bumper. The vehicle can comprise military vehicles, police vehicles, armored trucks, sports utility vehicles, boats, and planes.

Figure 8:
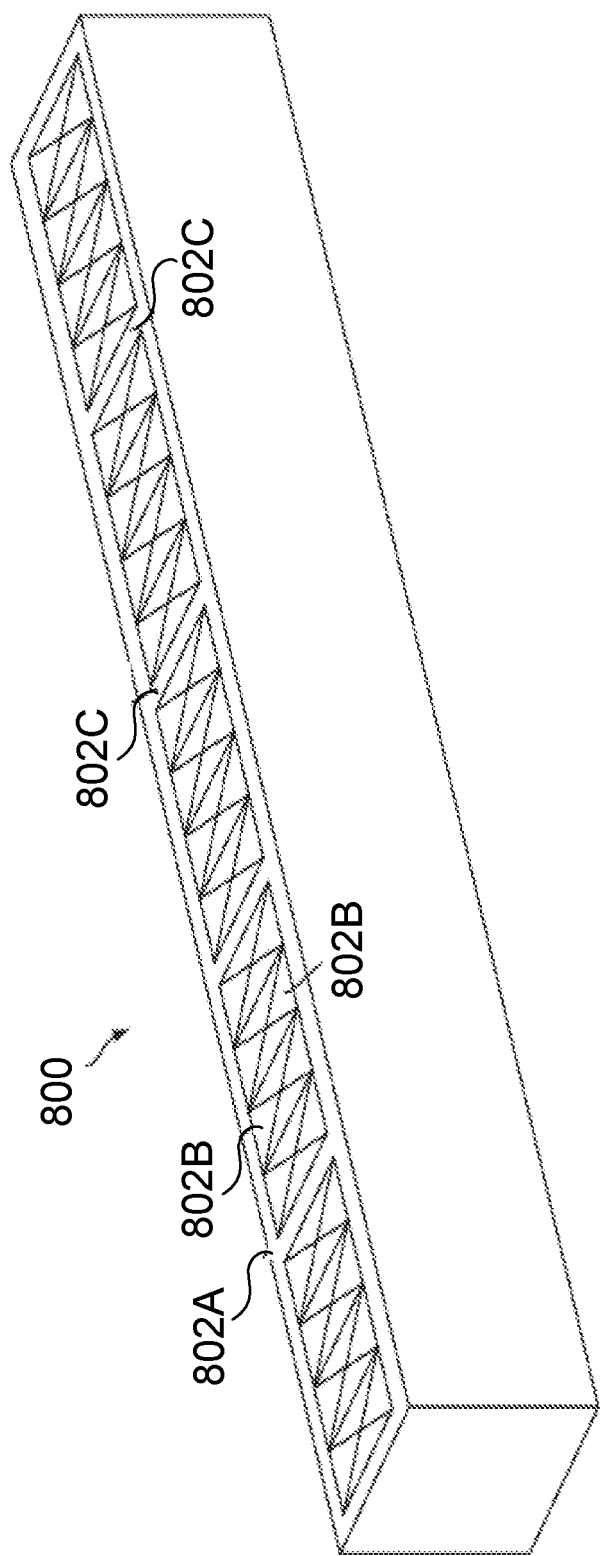
FIG. 8 is a schematic illustration of a multi-layered ballistic armor component in the form of a vehicle bumper having segmented polymer foam regions in accordance with an embodiment of the present technology.

When used in bumpers, doors and outer rims, the foam materials can be used to absorb energy from high impact crashes, protect the vehicles occupants, and to dissipate force from impact of ballistic projectiles. In one example, the polyurethane foam layer can be poured into blocks 4 ft. in length, 5.5 inches in height and 4 or 3 inches in width (approximately to 8 to 10 lbs) over a ballistic impact absorption layer. These blocks can then be used as the front and rear bumpers of a mobility vehicle or watercraft. The blocks are capable of absorbing high impact energy during high speed crash, are virtually indestructible and capable of absorbing repeated high energy impact forces. As illustrated in FIG. 8, the bumper 800 is formed of a polyurethane/polyorganosiloxane foam layer 802A that is then cut with a programmable software using a high speed water cutting jet machine from Omax. The programmable software cut various geometric circles and X shapes to allow room for the soft foam 802B layer. Varying programming can be utilized to cut the hard foam in different geometric shapes and size. In one embodiment, a 2 inch wide layer of X's is made and the triangular voids are filled with the polyurethane foam. To fill the void, the polyurethane foam is placed in a mold and as it is rising the polyurethane/polyorganosiloxane foam is placed on top. This allows polyurethane foam to fill the X space during the polymerization process. In FIG. 8 a 1 inch wide hard polyurethane/polyorganosiloxane foam on the outer edges that are interconnected by columns 802C every 8 inches, with an inner layer of the polyurethane foam. The same methodology and cutting jet machine can also be manufactured with the polyurethane foam as the outer layer and the polyurethane/polyorganosiloxane foam as the inner layer depending on the particular application, desired weight and energy absorption characteristics.

In yet another embodiment, blocks of the polyurethane foam, the polyurethane/polyorganosiloxane foam or blocks containing both of these foams and/or ballistic impact absorption layers can be created in varying length, width and shape to fit as a cushion within doors of a vehicle or around the exterior of a watercraft. These foams will function as a cushion in the event of a collision. The foam blocks can be secured against a metal framework so that the foam blocks can take, absorb and dissipate impact forces in a crash.

In yet another embodiment, the polyurethane foam, the polyurethane/ polyorganosiloxane foam or blocks containing both of these foams can be created and placed between train cars. The foams can be used to absorb an extremely high impact force associated with a collision. This can provide protection among adjacent train compartments by preventing these compartments from compounding each other.

Durability

It is important to note that the fused soft foam layer and the hard (polyurethane/polyorganosiloxane) foam layer maintains its shape after a high load force is exerted upon it. For example, when a 6 ton X5 BMW runs over these products, the foam flattens under the sheer loads but returns to its original shape without any damage: i.e. reverting back to the shape of a helmet or a groin cup instantly once load is dissipated. The bumper layer is capable of holding the entire weight of a car with slight indentation to accommodate the weight absorption but without any deformation or damage.

EXAMPLES

Example 1

Polyurethane Foam

In one embodiment, the polyurethane foam layer of the multi-layered ballistic armor was created by mixing; 20 grams of activated hardwood carbon (60 ml by volume) with 30 grams of Hydrogel-N (Polytek®) (120 ml by volume), 24 grams of fumed silica (Polytek®) (240 ml by volume), 2 grams of hydroxyethyl cellulose (5 ml by volume), and 0.1 ml of colorant (Polytek) to the polyol mixture containing 2000 ml of liquid solution of polyol (part B-Polytek) at room temperature. Then, 60 ml of melted and filtered Lodgepole or Pine rosin (200° C.), 10 ml of melted natural rubber (350° F.), 10 ml of melted polystyrene-block-polybutadiene-block-polystyrene (Styrene 30 wt %-Aldrich) (375° F.), 120 ml of polybutadiene synthetic rubber, 240 ml polysulfide polymer solution, and 3 ml of pure silk fibroin solution (Silktap) were added to above mixture at room temperature and stirredin the presence of 3 grams each of sulfur, stearic acid and zinc oxide. This mixture was then placed in a vacuum chamber for 5 minutes and allowed to sit idle for 10 minutes under negative pressure. Following this, 1000 ml of polymethylene bis phenylisocyanate (MDI) and butyl benzyl phtalate solution (Foam Part A-Polytek) was then added to the entire mixture above and stirred vigorously for 10 seconds. The whole mixture is then poured into mold where polymerization reaction begins immediately to form a novel modified soil foam of a 4 lb/cubic feet density.

Example 2

Polyurethane/Polyorganosiloxane Foam

In another embodiment, the polyurethane foam layer of the multi-layered ballistic armor comprises a hard (polyurethane/polyorganosiloxane) foam. The hard foam composition was created as subsequently described. First, 2000 ml of the polyurethane foam mixture, from above, was made without the addition of MDI solution and without pouring the mixture into a mold. Then, 160 ml polyorganosiloxane platinum catalyst solution (Soma Foams Part A-smooth -On Inc) was added to that mixture and stirred. A separate mixture containing 1000 ml of MDI and butyl benzyl phtalate solution (Polytek part A) and 80 ml of polyorganosiloxane (Soama Foama Part B-smooth -On Inc) is then combined and added to the mixture above and stirred vigorously for 10 seconds. The whole mixture is poured into a mold. The polymerization reaction is immediate, exothermic and give rise to hard foam with extremely high tensile strength, toughness and compression resistance with far better flame retardant quality than traditional polyurethane foam and polystyrene used for impact absorption.

Modifications to Examples 1 and 2

Example changes include using different isocyanate, polyol and/or silicone product, isoprenoid, rubber, piperazine, fibroin and other reinforcers, gelling agents and additives with different methods, volume concentration and density. Concentrations by volume of the above can be varied to form a more hardened or softer foam. For harder flexible foam 6-10% by volume of melted pine rosin can be added without affecting the polymerization foaming reaction. Alternatively, lower concentrations of pine rosin, e.g., 2.5% by volume, can be used for softer flexible foam. In addition, varied concentration by volume of activated hardwood carbon, fumed silica, hydrogel-N, cellulose, natural and synthetic rubber, silk fibroin and polysulfide polymers can be used with different concentration of melted pine rosin. Variations of these components can also give rise to softer or harder polyurethane foam to be used for different protective commercial applications.

In addition different variations and concentrations of polyorganosiloxane in conjunction with polyurethane, polysulfide polymers, natural and synthetic rubber and silk fibroin can be used to affect cell size, hardness, resiliency and toughness of the hard and soft foam for specific applications. It is worth noting that Soma Foama 25 (25 lbs per cubic feet density) instead of 15 (15 lbs per cubic feet density) or in conjunction with Soma Foama 15 can be used to further strengthen the hard foam. Other variations in chemical structure of the silicon polymers can be used as substitute with similar and /or differing characteristics of the final foam product.

Impact Force Demonstrations-Foam Layer Materials

Bumpers

A vehicular bumper 5.5 inches highs 4 inches wide×4 ft in length was created using the formulations in examples 1 and 2. The bumper was only 12 lbs pounds in weight and was attached to the front bumper of a 6 ton SUV using industrial strength Velcro. The SUV, traveling at speed of 130 miles per hour the back bumper of another car at rest. Neither car had any resultant structural damage.

Padding-Impact Force

The polyurethane foam composition was created using the formulation in example 1. The foam was molded into the shape of a 4 inches high×12 inches wide×36 inches long soft foam pad. A full 50 lb plastic Poland Spring Bottle was dropped from 18 ft height above onto the foam. The water bottle did not rupture or have any structural damage following the drop. The polyurethane foam absorbed all of the energy on impact and did not deform.

Repeated Impacted Forces

The polyurethane foam composition above was created using the formulation in example 1. The foam was repeatedly hit using unlimited impact from an industrial hammer at high velocity. The foam did not deform. The tear strength of the foam appears to be at least 20 to 30 times stronger than the regular flexible polyurethane foam in the market today.

Helmets

A polyurethane foam polyurethane/polyorganosiloxane foam combination was created using the formulations in the examples above. The layers were molded such that the polyurethane/polyorganosiloxane foam was exterior to the polyurethane foam layer. This composition was molded as a 1 lb in weight insert for a helmet. Upon testing the insert was shown to dull the effect of an impact to the level that concussion resulting from a rotational force impact might be severely reduced and/or eliminated.

A similar foam design can be molded for use in a motorbike helmet (about 1 lb in eight) instead of the usual EPS used commercially today (0.5 lbs weight). Similar benefits can be realized with motorbike helmets.

Spectral Analysis-Foam Layer Materials

Figure 9:
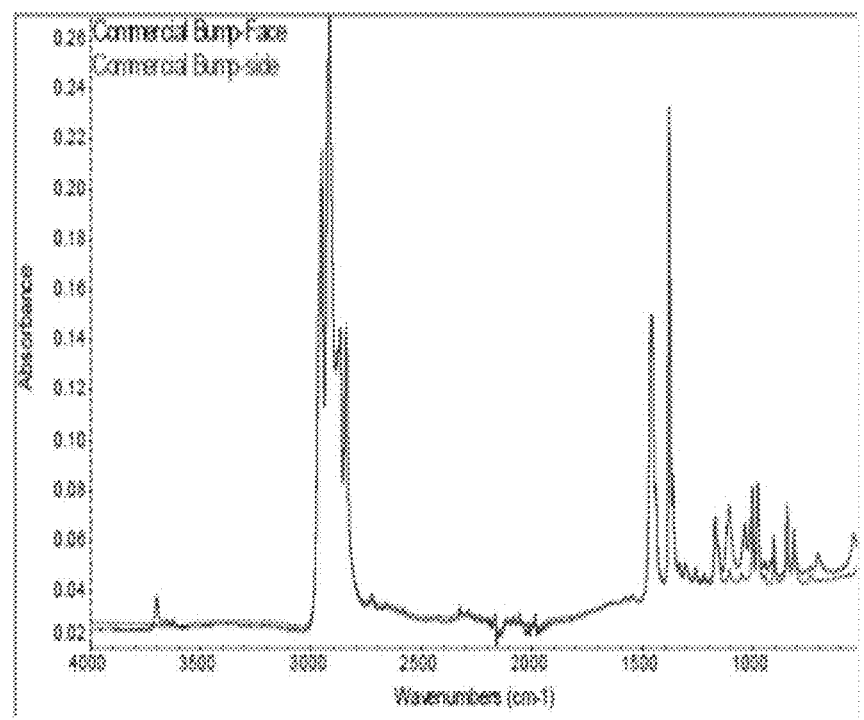
FIG. 9 is a graph of the FT-IR Spectra data for one embodiment of the foam described herein overlaid with the data of a commercially available foam.
Figure 10:
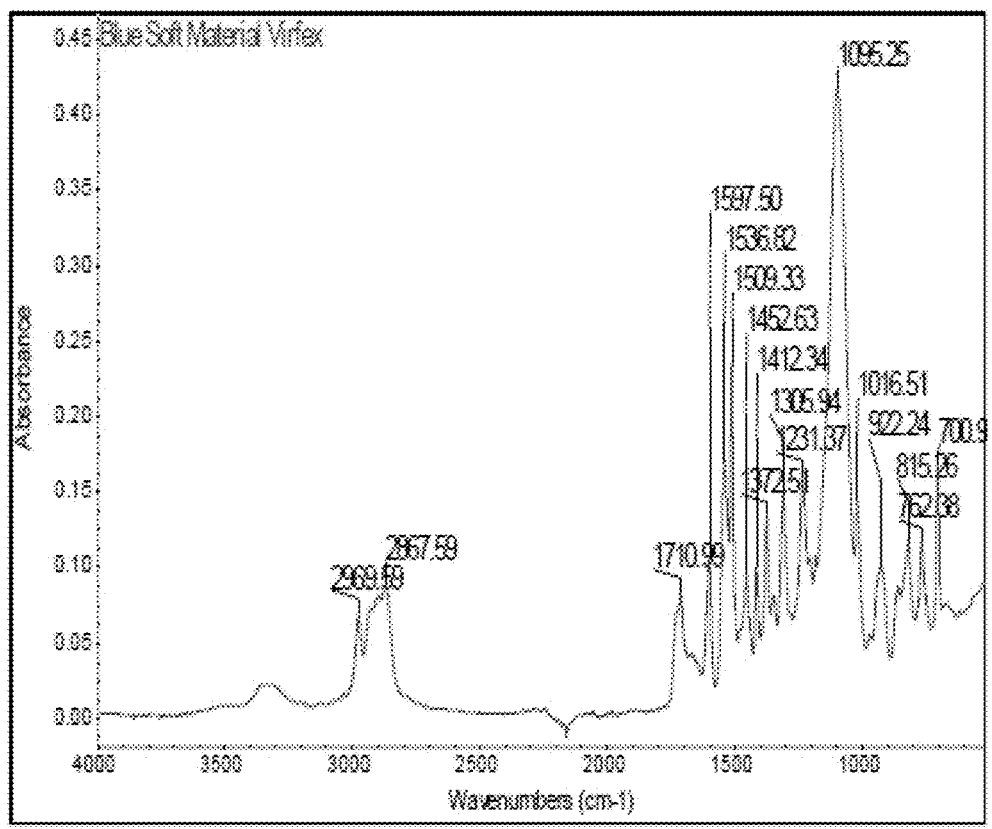
FIG. 10 is a graph of the FI-IR Spectra data for one embodiment of the soft foam described herein.
Figure 11:
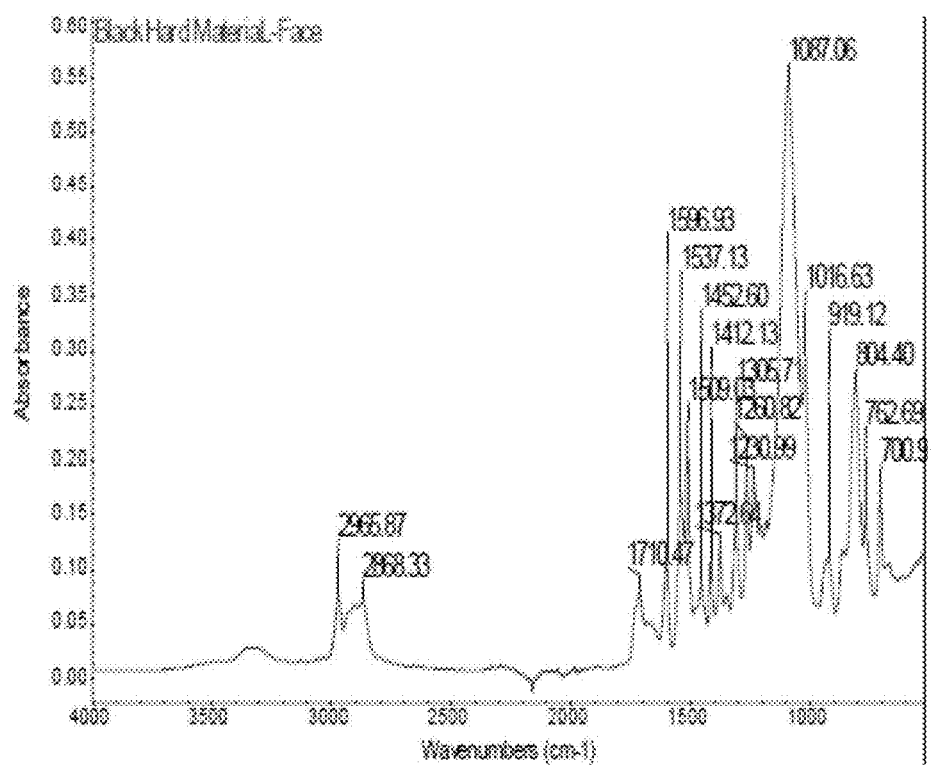
FIG. 11 is a graph of the FT-IR Spectra data for the face of one embodiment of the hard foam described herein.
Figure 12:
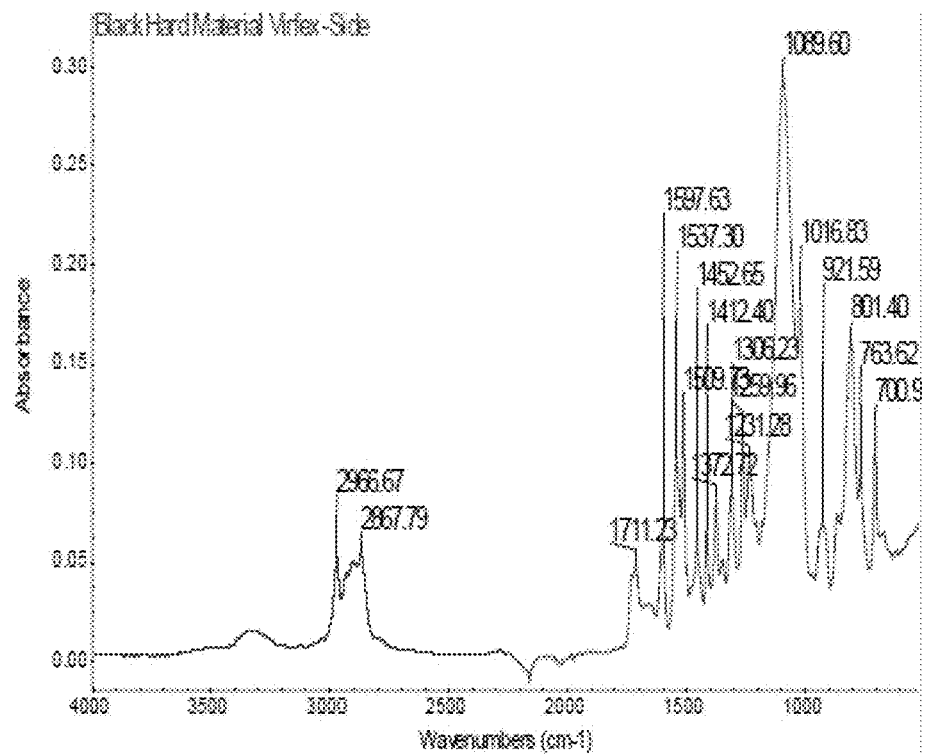
FIG. 12 is a graph of the FT-IR Spectra data for the side of one embodiment of the hard foam described herein.
Figure 13:
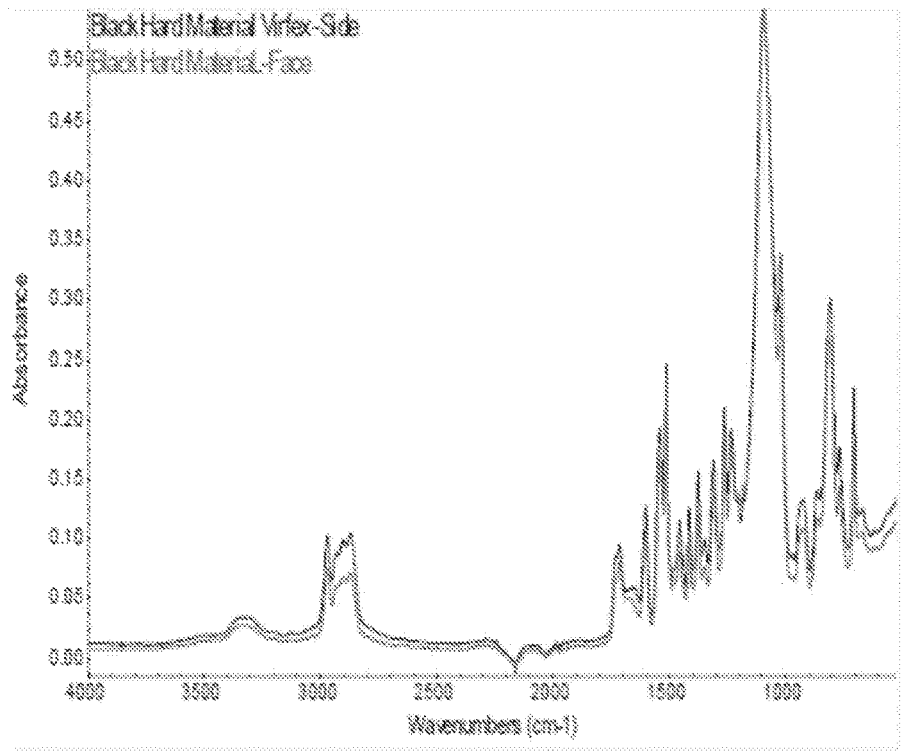
FIG. 13 is a graph of the FT-IR Spectra data for one embodiment of the hard foam described herein.

A sample of the soft foam and the hard foam materials were created in a method similar to those demonstrated in Examples 1 and 2. A 1×1 portion of the sample materials were analyzed by FT-IR spectroscopy using a Nicolet IS50 FT-IR spectrometer having a IS50-ATR diamond attached. The hard foam material had absorption peaks were present at 2837-2949, 1455, and 1375 cm$^{\infty-2}$. The location of these, based on special analysis using OMNIC databases, indicate that the peaks appear at or near the location of the polypropylene containing polymers. Small absorption peaks also were present at 3696 and 1167 cm$^{-2}$. These peaks appear to match peaks that have been observed for kaolin clay. The spectral data was then overlaid adjacent to spectral data of a commercially available foam. See FIG. 9. FIG. 10 shows the spectral data for the soft foam. FIGS. 11 and 12 show the spectral data for the hard foam. FIG. 13 shows the spectral data for the soft and hard foam collectively. An absorption peak near 1095 cm$^{-1}$ indicates the presence of siloxane. A broad absorption peak near 3300 cm$^{-1}$ indicates an alcoholic or amine structure. An aliphatic absorption appeared between 2868 and 2970 cm$^{-1}$.

Compression Analysis

Compression analysis was performed according to ASTM D1621-10 "Standard Test Method for Compressive Properties of Rigid Plastics" in a Mark-10 testing system with a 100 lb load cell compression platen. The strain rate was set to 0.1 min$^{-1}$. The compressive modulus (the ratio of the compressive stress to the resulting compressive strain) and the yield point (the stress at the point that the sample cannot recover the deformation) are shown in Table 1.

TABLE 1

Compression Data

|  | Modulus (PSI) | STD | Yield (PSI) Average (n = 5) | STD |
| --- | --- | --- | --- | --- |
| Hard Foam | 344.5 |  | +/−62.5 | 31.0 | +/−4.8 |
| Soft Foam | 31.6 |  | +/−17.4 | 2.8 | +/−1.1 |
| Commercial Foam | 123.8 |  | +/−58.8 | 6.4 | +/−1.7 |

Dynamic Mechanical Analysis (DMA)

Figure 14:
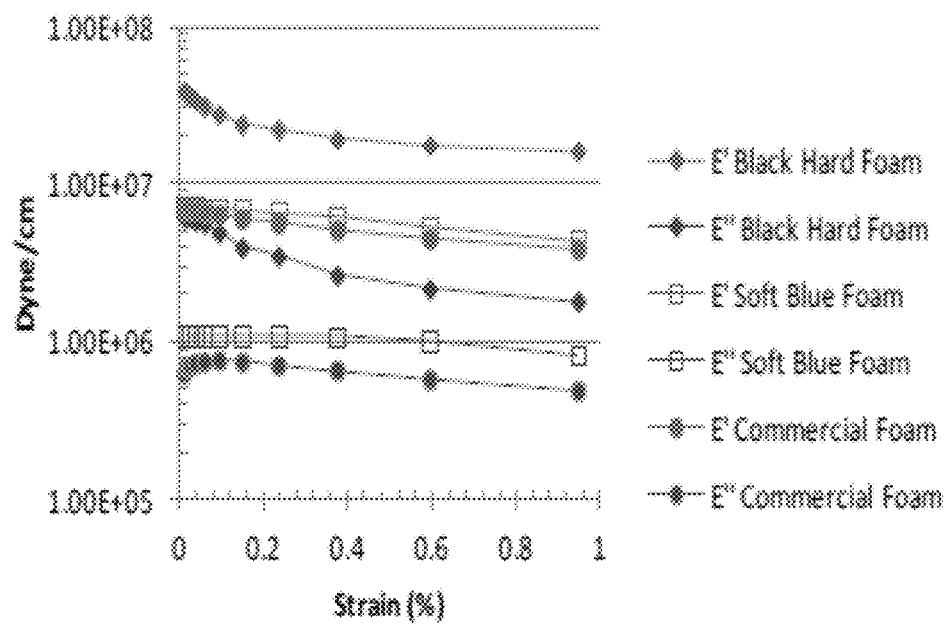
FIG. 14 is a graph of the results of a Strain Sweep Test for an embodiment of hard foams as described herein, for an embodiment of soft foams as described herein, and commercially available foams.

Dynamic mechanical analysis was conducted according to RSAII Dynamic Mechanical Analyzer (TA Instruments) in compression mode. The Dynamic Strain Sweep shows a series of strains from 0.1% to 1.0% applied to the samples at 30° C. at a frequency of 100 Hz. See FIG. 14. The Dynamic Frequency Sweep shows a series of frequencies from 0.1 to 100 Hz evaluated at a constant strain of 0.1% at 30° C. See FIG. 15. The data indicates that the hard foam has a larger storage modulus E' than soft foam. The soft foam has a similar storage modulus E' to the commercial foam. The hard foam and the soft foam had a slighter larger loss modulus E" than the commercial foam, indicating a greater capacity to dissipate energy by deformation.

Foam Durability Testing

Figure 15:
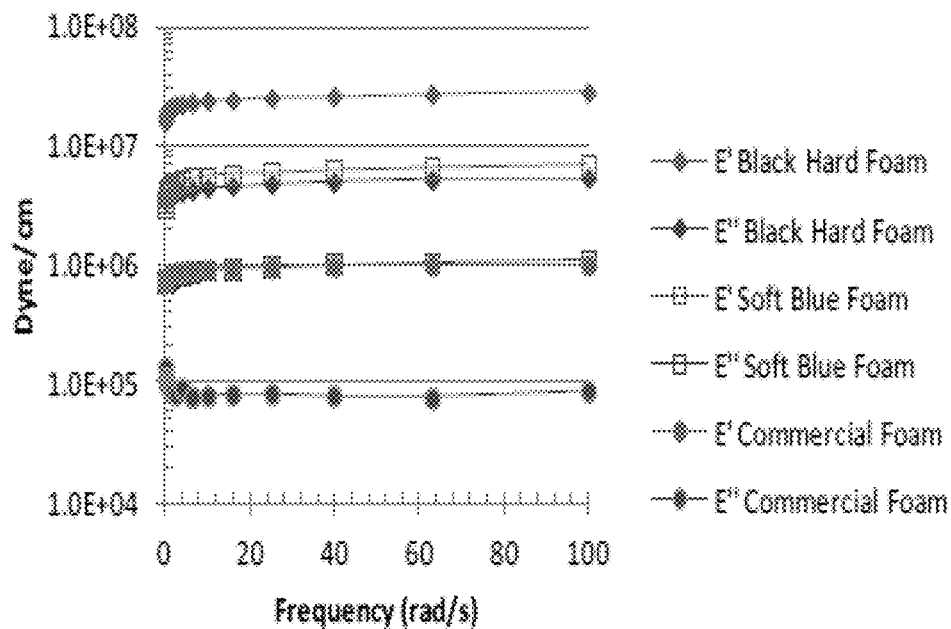
FIG. 15 is a graph of the results of a Frequency Sweep Test for an embodiment of hard foams as described herein, for an embodiment of soft foams as described herein, and commercially available foams.
Figure 16:
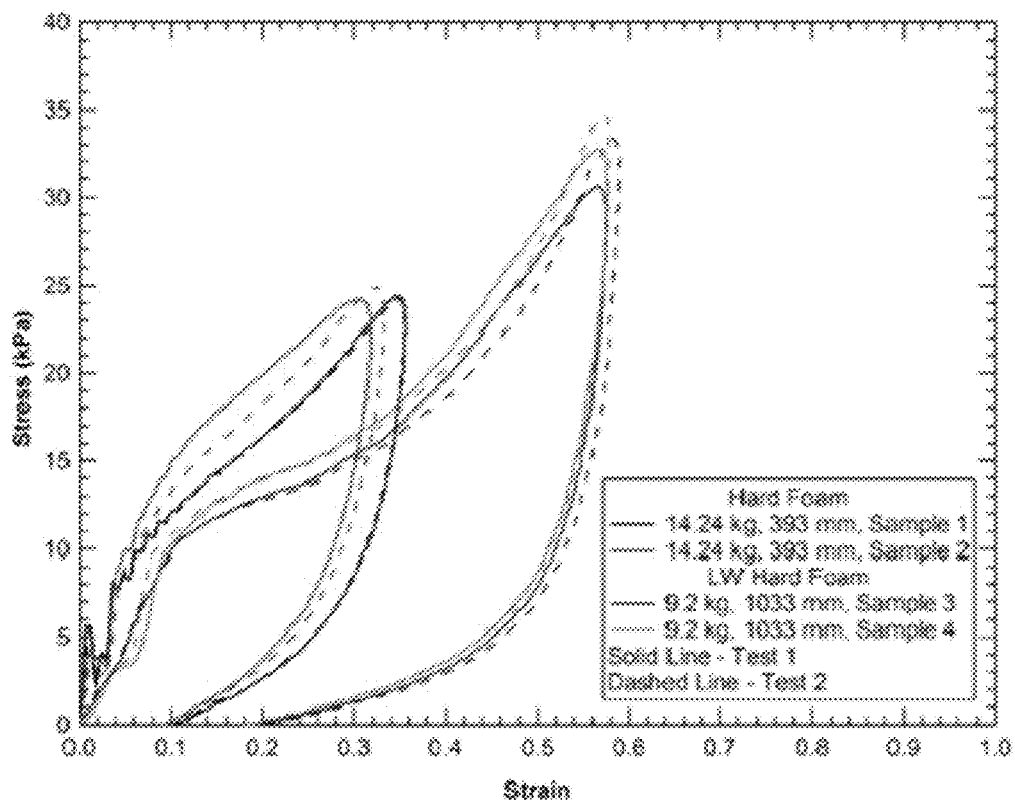
FIG. 16 is a graph of foam durability testing showing strain versus stress response curves for several hard foams of the present invention.
Figure 17:
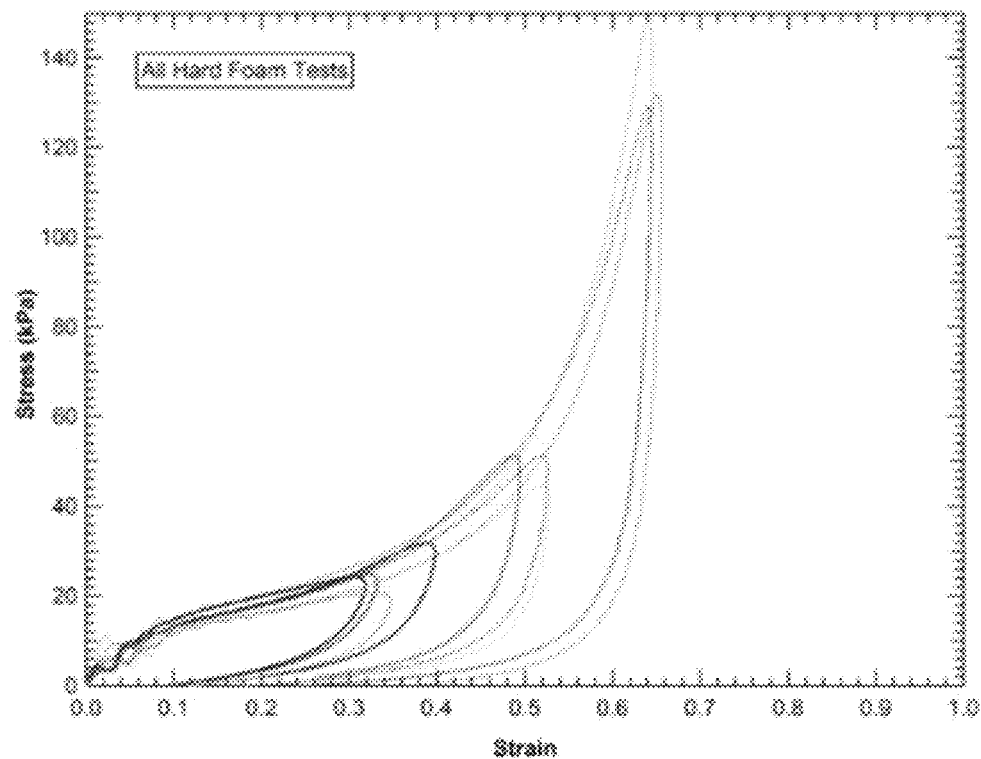
FIG. 17 is a graph of foam durability testing showing strain versus stress response curves for several hard foams of the present invention.

Hard and soft foams were tested for durability and quickly returned to the original geometric shape and showed no mechanical damage in repeated testing. Foam durability tests were also conducted on LW and ULW hard foams which returned to their original geometric shape with no mechanical damage, but only showed repeatability up to strains of about 70% as shown in FIG. 15 and 16. These foams also displayed little to no rate effect on crush response for all impact energies tested.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A multi-layered ballistic armor comprising:
   a layer of a polyurethane foam material, wherein the polyurethane foam material comprises a polyurethane formed from an isocyanate and a polyol, a polymerization reaction initiator that is an isoprenoid compound, and a polymerization reaction accelerator, wherein the polyurethane foam material further comprises a polyorganosiloxane and a polymerization catalyst, and wherein the polyurethane and the polyorganosiloxane are cross-linked to one another in a common layer using a cross-linker; and a ballistic impact absorption layer.

2. The multi-layered ballistic armor of claim 1, wherein the ballistic impact absorption layer is a composite multi-layer assembly comprising two or more layers wherein each layer independently comprises a member selected from the group consisting of para-amid synthetic fiber, ballistic ceramic, metal, ultrahigh molecular weight polyethylene fiber woven fabrics, synthetic woven fiber, graphene, and combinations thereof.

3. The multi-layered ballistic armor of claim 2, wherein the composite multi-layer assembly comprises a ballistic ceramic layer and a metal layer.

4. The multi-layered ballistic armor of claim 3, wherein the layer of the polyurethane foam material is adjacent to the ballistic ceramic layer on a strike side of the armor, and the metal layer is a titanium layer sandwiched between two ultrahigh molecular weight polyethylene (UHMWPE) fiber woven fabric layers.

5. The multi-layered ballistic armor of claim 3, wherein the ballistic ceramic layer comprises a member selected from the group consisting of alumina, silicon carbide, boron carbide, titanium diboride, aluminum oxide, and combinations thereof.

6. The multi-layered ballistic armor of claim 3, wherein the metal layer is segmented having a gap of less than 2 mm between layer segments to increase flexibility of the armor.

7. The multi-layered ballistic armor of claim 1, further comprising a second layer of the polyurethane foam material oriented such that the ballistic impact absorption layer is between the layer of the polyurethane foam material and the second layer of the polyurethane foam material.

8. The multi-layered ballistic armor of claim 1, wherein the ballistic impact absorption layer is a woven para-amid synthetic fiber fabric.

9. The multi-layered ballistic armor of claim 1, wherein the polyurethane is present in a first portion, and the polyorganosiloxane is present in a second portion adjacent to the first portion and the polyurethane and the polyorganosiloxane are cross-linked together to form a composite material.

10. The multi-layered ballistic armor of claim 9, wherein the first portion has a density of about 4 lbs/ft$^3$ and the second portion has a density of about 15 lbs/ft$^3$.

11. The multi-layered ballistic armor of claim 1, wherein the polyurethane foam material comprises from about 66 wt. % to about 87 wt. % of the polyurethane and from about 8 wt. % to about 25 wt. % of the polyorganosiloxane.

12. The multi-layered ballistic armor of claim 1, wherein the polymerization reaction initiator is abietic acid.

13. The multi-layered ballistic armor of claim 1, wherein the polymerization reaction accelerator comprises a member selected from the group consisting of charcoal, activated carbon, diamonds, fullerenes, graphites, coke, coal, and combinations thereof.

14. The multi-layered ballistic armor of claim 1, wherein the polyurethane foam material further comprises at least one of: a gelling agent, an emulsification control agent, a reinforcement filler, and a reinforcement polymer.

15. The multi-layered ballistic armor of claim 14, wherein the emulsification control agent is fumed silica and the reinforcement filler cross-links with the polyurethane foam.

16. The multi-layered ballistic armor of claim 1, wherein the polyurethane foam further comprises a polysulfide.

17. The multi-layered ballistic armor of claim 1, wherein the polyurethane foam is a hard foam and has a compressive modulus of about 275 psi to about 425 psi.

18. The multi-layered ballistic armor of claim 1, wherein the polyurethane foam is a soft foam and has a compressive modulus of about 10 psi to about 50 psi.

19. A bullet proof vest having a receiving pocket in which the multi-layered ballistic armor of claim 1 is oriented.

20. The multi-layered ballistic armor of claim 1, wherein the multi-layered layered ballistic armor has an armor level rating of IIIA, III, or IV per NIJ-Standard-0101.6, published July 2008, as established by the National Institutes of Justice Ballistic-Resistance Body Standards and Testing Program.

21. A method of coating a material with a polyurethane foam to form a multi-layered ballistic armor, comprising:
applying the polyurethane foam as an exterior coating to the material to form a coated material,
wherein the material comprises a ballistic impact absorption material,
wherein the polyurethane foam is formed from a polyurethane formed of an isocyanate and a polyol; a polymerization reaction initiator comprising an isoprenoid compound; and a polymerization reaction accelerator, wherein the polyurethane foam further comprises a polyorganosiloxane and a polymerization catalyst, and wherein the polyurethane and the polyorganosiloxane are cross-linked to one another in a common layer using a cross-linker.

22. A multi-layered ballistic armor comprising:
a layer of a polyurethane foam material, wherein the polyurethane foam material comprises a polyurethane formed from an isocyanate and a polyol, a polymerization reaction initiator that is an isoprenoid compound, and a polymerization reaction accelerator; and
a ballistic impact absorption layer,
wherein the polyurethane foam is either a) a hard foam and has a compressive modulus of about 275 psi to about 425 psi, or b) a soft foam and has a compressive modulus of about 10 psi to about 50 psi.

* * * * *